(12) United States Patent
Park

(10) Patent No.: US 12,279,154 B1
(45) Date of Patent: Apr. 15, 2025

(54) METHOD OF TRANSMITTING BSM MESSAGE OF V2X COMMUNICATION DEVICE PROVIDED IN VEHICLE IN AUTONOMOUS DRIVING SYSTEM

(71) Applicant: LG Electronics Inc., Seoul (KR)

(72) Inventor: Suho Park, Seoul (KR)

(73) Assignee: LG Electronics Inc., Seoul (KR)

( * ) Notice: Subject to any disclaimer, the term of this patent is extended or adjusted under 35 U.S.C. 154(b) by 488 days.

(21) Appl. No.: 16/489,598

(22) PCT Filed: Jul. 31, 2019

(86) PCT No.: PCT/KR2019/009539
§ 371 (c)(1),
(2) Date: Aug. 28, 2019

(87) PCT Pub. No.: WO2021/020623
PCT Pub. Date: Feb. 4, 2021

(51) Int. Cl.
*H04W 28/04* (2009.01)
*G07C 5/00* (2006.01)
(Continued)

(52) U.S. Cl.
CPC ............ *H04W 28/04* (2013.01); *G07C 5/008* (2013.01); *H04B 17/373* (2015.01);
(Continued)

(58) Field of Classification Search
CPC ......... H04W 4/38; H04W 4/40; H04W 72/20; H04W 72/23; H04W 28/04; H04W 24/04;
(Continued)

(56) References Cited

U.S. PATENT DOCUMENTS

2012/0105625 A1* 5/2012 Richardson .......... G01B 11/022
348/135
2016/0027300 A1* 1/2016 Raamot ................ G08G 1/0145
340/922
(Continued)

FOREIGN PATENT DOCUMENTS

KR 1020180057386 5/2018
KR 1020180062737 6/2018
(Continued)

OTHER PUBLICATIONS

SAE J2735—Dedicated Short Range Communications (DSRC) Message Set Dictionary, https://www.standards.its.dot.gov/Factsheets/Factsheet/71 (Year: 2009).*
(Continued)

*Primary Examiner* — Iqbal Zaidi
(74) *Attorney, Agent, or Firm* — Fish & Richardson P.C.

(57) ABSTRACT

Disclosed herein is a method of transmitting a BSM message of V2X communication device provided in a vehicle in an autonomous driving system. The method of transmitting a BSM message of a V2X communication device according to an embodiment of the present invention may multiplex sensor data and GPS data received from in-vehicle sensors, respectively, and use the multiplexed sensor data to generate BSM data. As a result, it is possible to enhance stability of the V2X system and more efficiently correct errors or the like occurring between sensors.

An autonomous vehicle according to the present invention may be linked with an artificial intelligence module, a drone (unmanned aerial vehicle (UAV)), a robot, an augmented reality (AR) device, a virtual reality (VR) device, devices related to 5G services and the like.

13 Claims, 24 Drawing Sheets

(51) Int. Cl.
*H04B 17/373* (2015.01)
*H04W 4/029* (2018.01)
*H04W 4/40* (2018.01)
*H04W 24/04* (2009.01)
*H04W 72/20* (2023.01)
*H04W 72/23* (2023.01)

(52) U.S. Cl.
CPC ............ *H04W 4/029* (2018.02); *H04W 4/40* (2018.02); *H04W 24/04* (2013.01); *H04W 72/20* (2023.01); *H04W 72/23* (2023.01)

(58) Field of Classification Search
CPC .... G05D 1/223; G06Q 30/0201; G06Q 10/20; B25J 9/16; B25J 9/1682
See application file for complete search history.

(56) References Cited

U.S. PATENT DOCUMENTS

| | | | |
|---|---|---|---|
| 2017/0105112 A1* | 4/2017 | Park | H04L 5/0035 |
| 2018/0261097 A1* | 9/2018 | Jiang | G08G 1/163 |
| 2018/0286225 A1 | 10/2018 | Lu et al. | |
| 2018/0357902 A1* | 12/2018 | Altintas | G08G 1/0112 |
| 2019/0052436 A1* | 2/2019 | Desai | H04W 72/0446 |
| 2019/0297499 A1* | 9/2019 | Hawkes | H04W 12/40 |
| 2019/0347939 A1* | 11/2019 | Kim | B60K 35/23 |
| 2019/0349802 A1* | 11/2019 | Weinfield | H04W 4/021 |
| 2020/0022089 A1* | 1/2020 | Guo | H04W 52/26 |
| 2020/0202292 A1* | 6/2020 | Doig | G01S 5/0027 |
| 2020/0258320 A1* | 8/2020 | Lu | G07C 5/008 |
| 2020/0307542 A1* | 10/2020 | Engstrom | F16H 61/0213 |
| 2021/0021974 A1* | 1/2021 | Kim | H04W 4/12 |
| 2021/0270615 A1* | 9/2021 | Kim | G01C 21/36 |
| 2022/0191875 A1* | 6/2022 | Panteleev | H04W 72/0453 |

FOREIGN PATENT DOCUMENTS

| | | |
|---|---|---|
| KR | 101929681 | 12/2018 |
| KR | 1020190032090 | 3/2019 |

OTHER PUBLICATIONS

N. Carter, M. A. Hoque and M. S. Ahmed, "Simulating Vehicle Movement and Multi-Hop Connectivity from Basic Safety Messages," SoutheastCon 2018, St. Petersburg, FL, USA, 2018, pp. 1-6, doi: 10.1109/SECON.2018.8479081. (Year: 2018).*

PCT International Search Report in PCT Appln. No. PCT/KR2019/009539, dated Apr. 28, 2020, 5 pages.

* cited by examiner

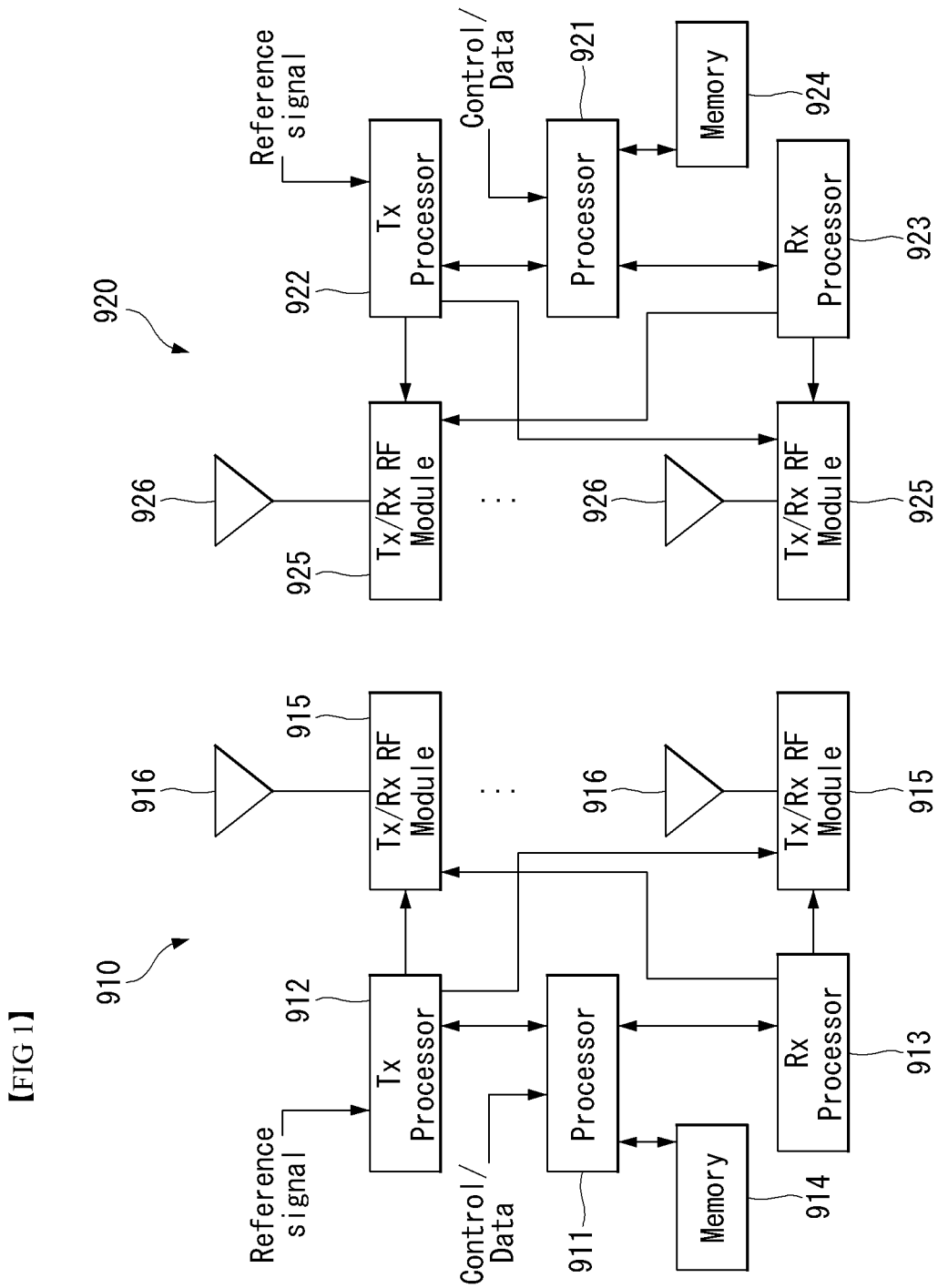
[FIG 1]

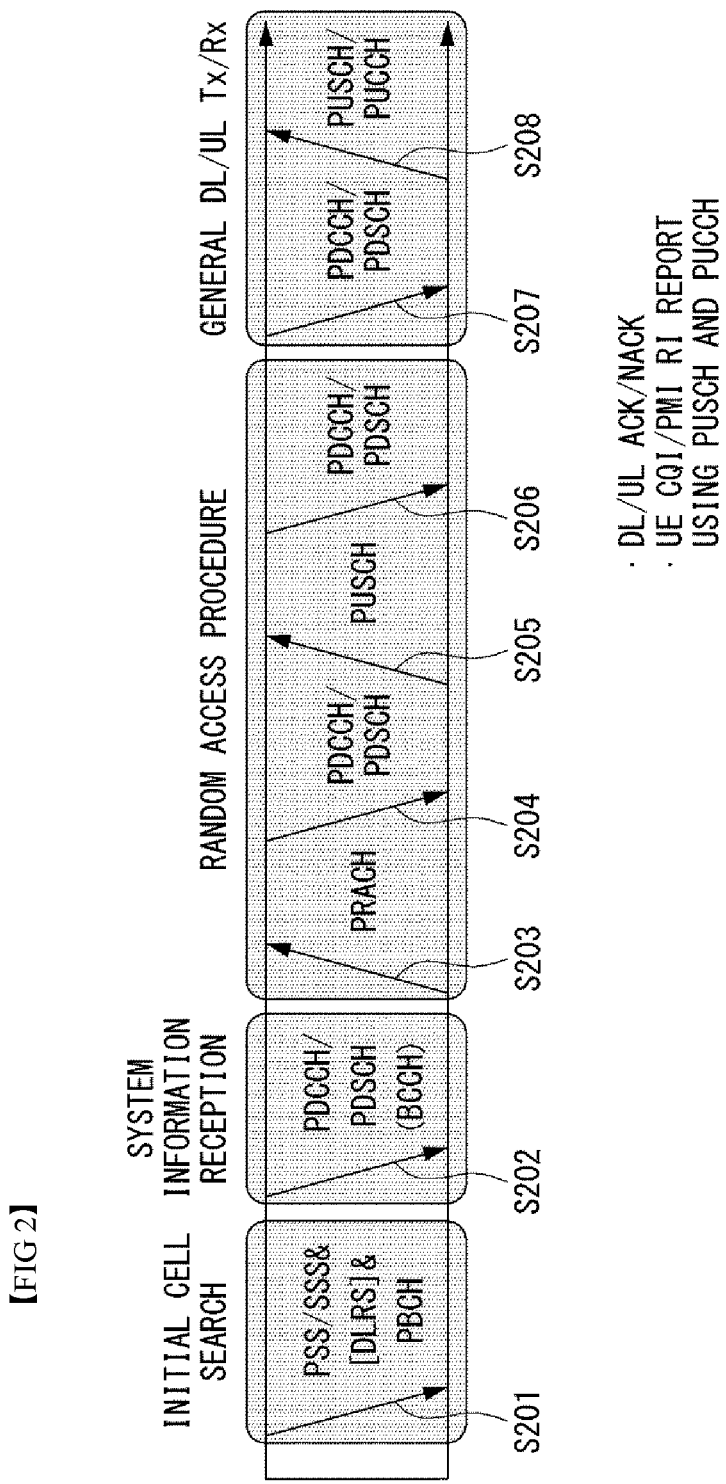
[FIG 2]

[FIG 3]
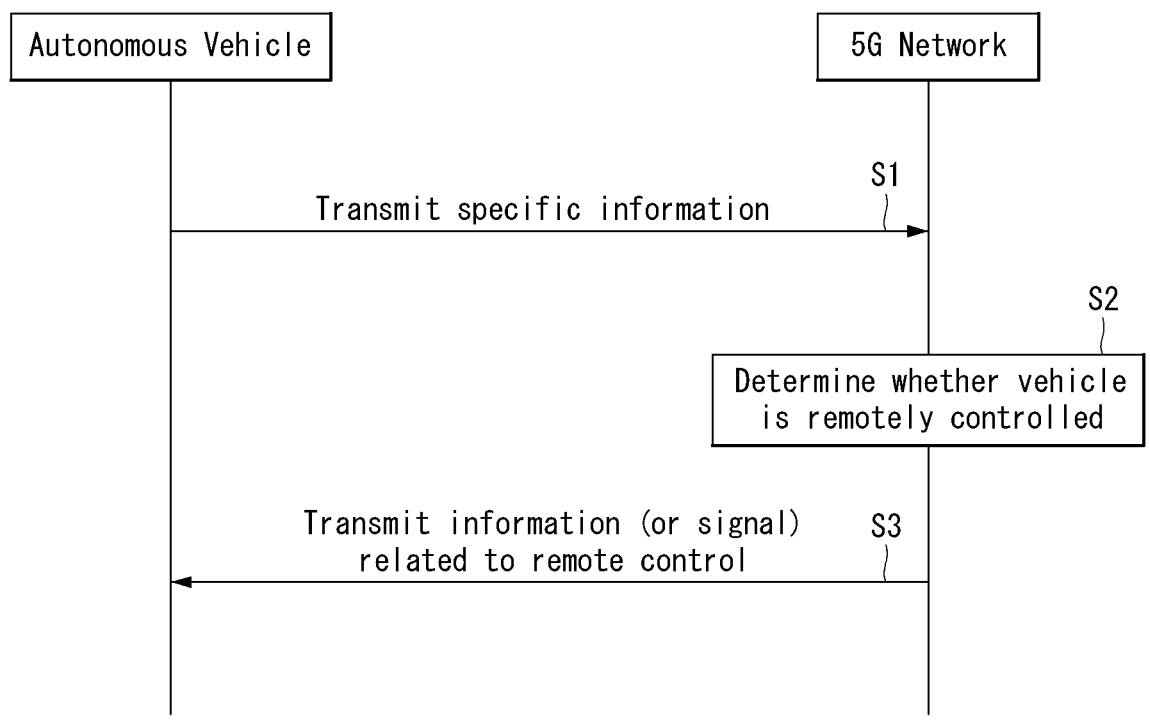

[FIG 4]
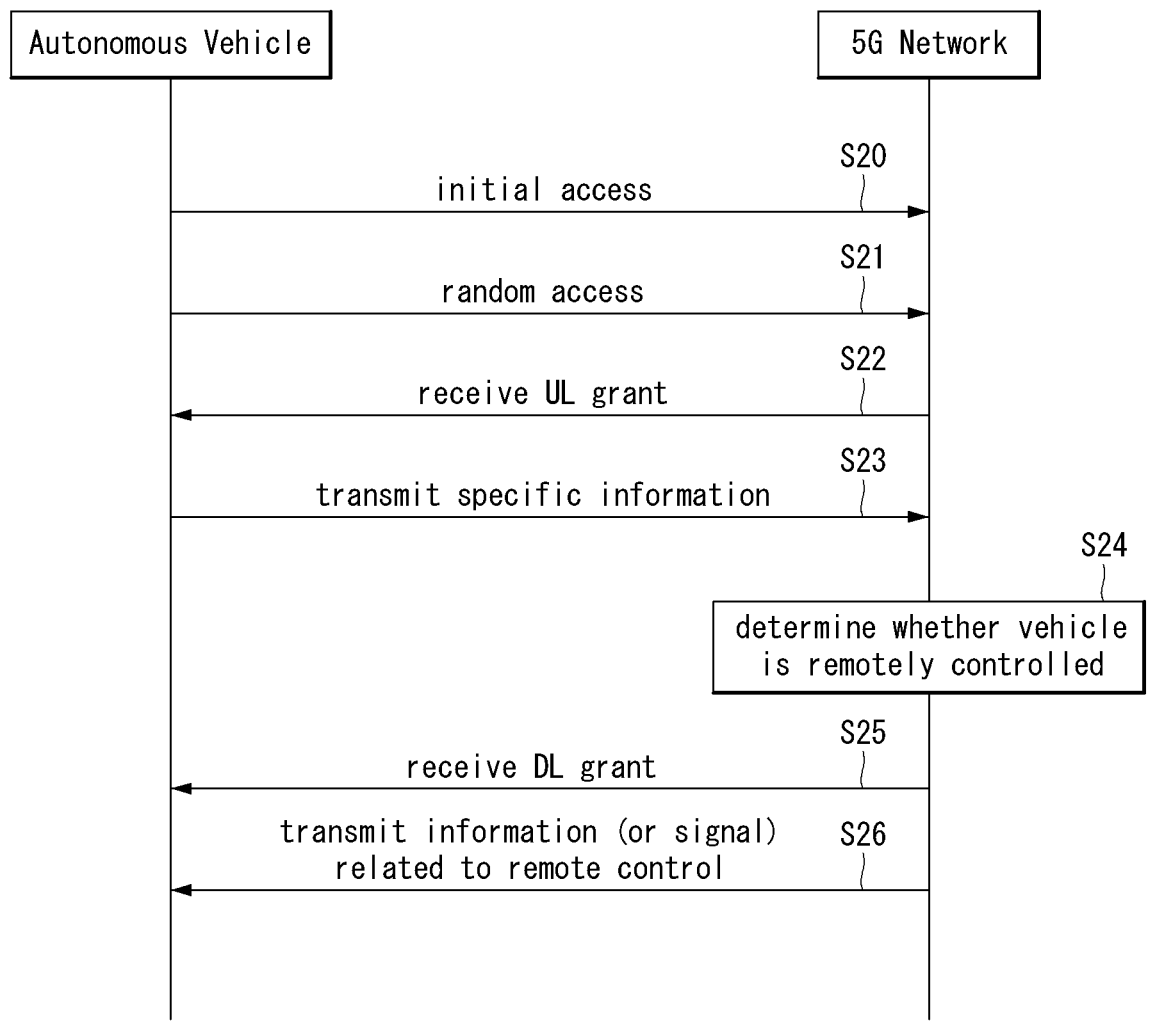

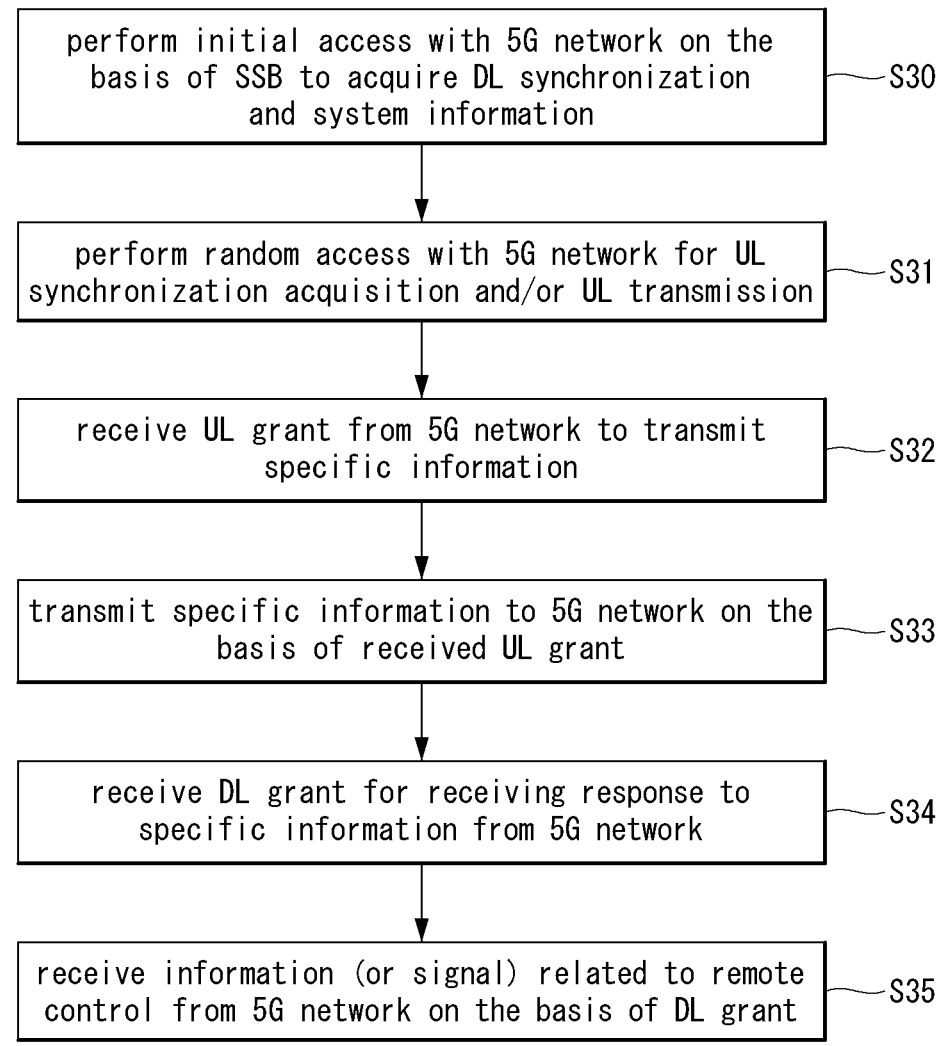

[FIG 6]
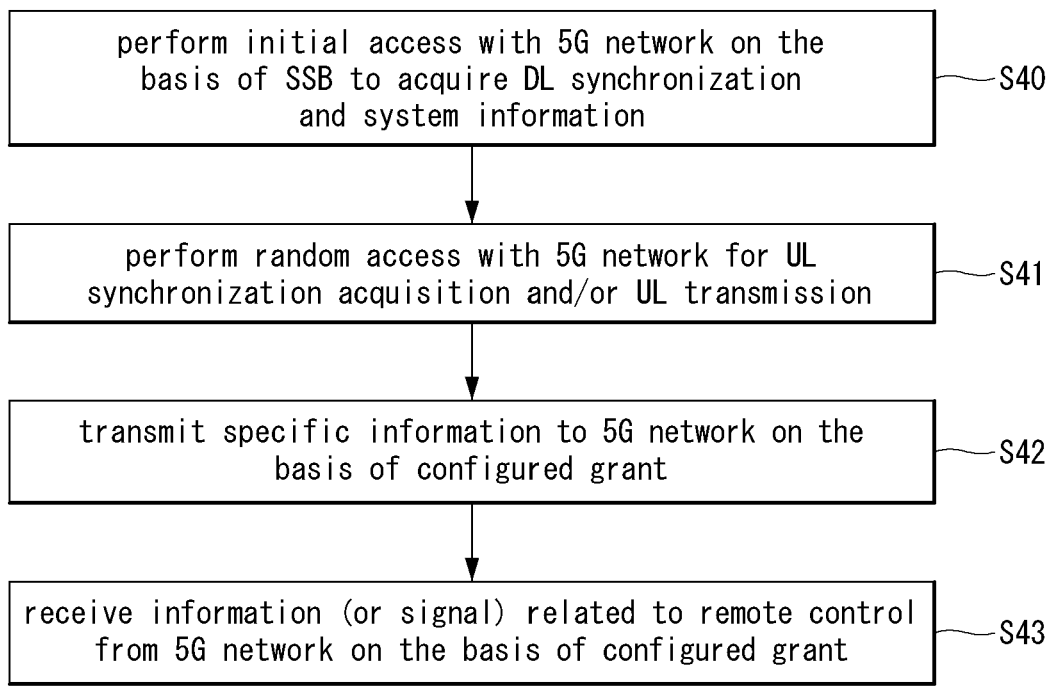

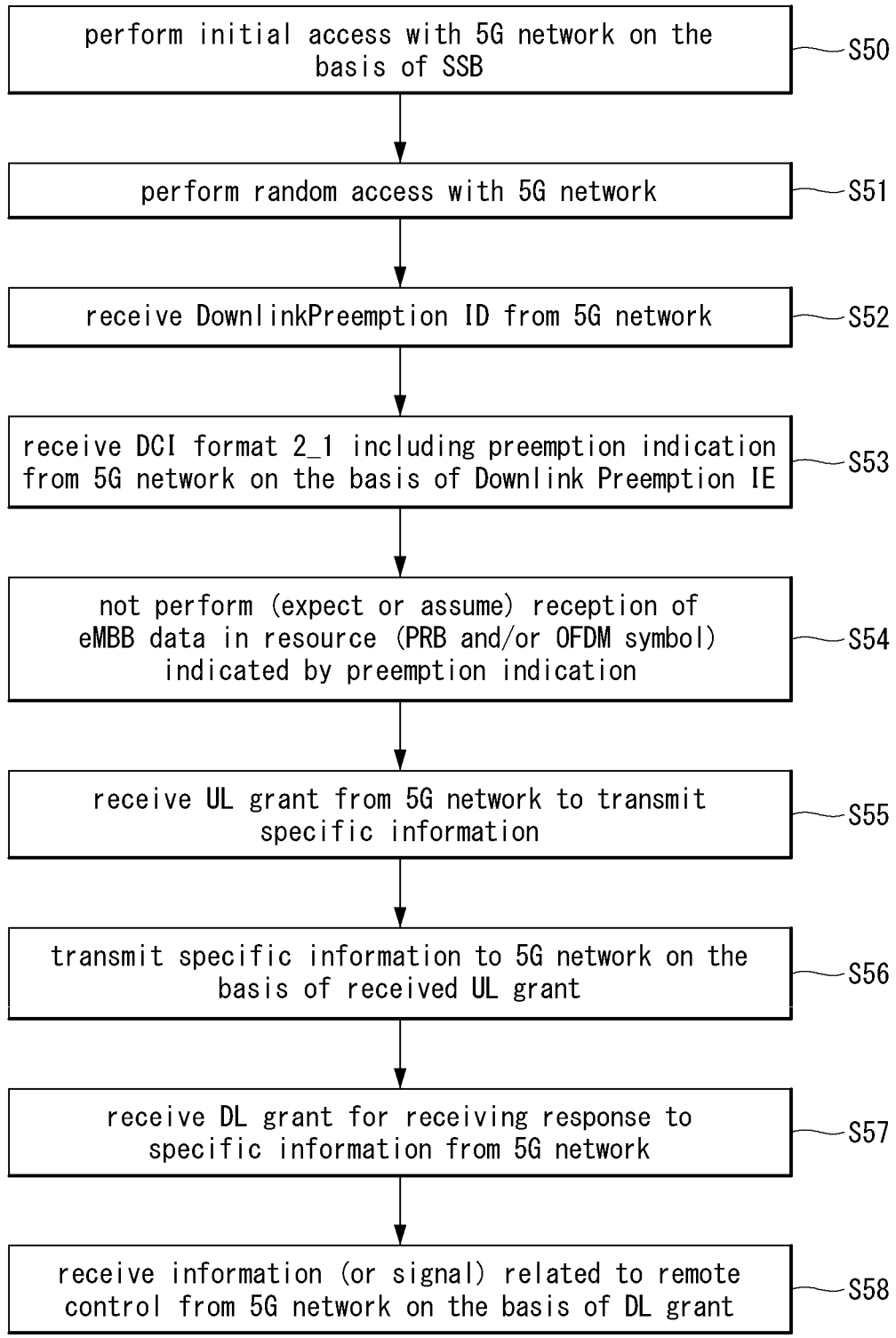
[FIG 7]

[FIG 8]
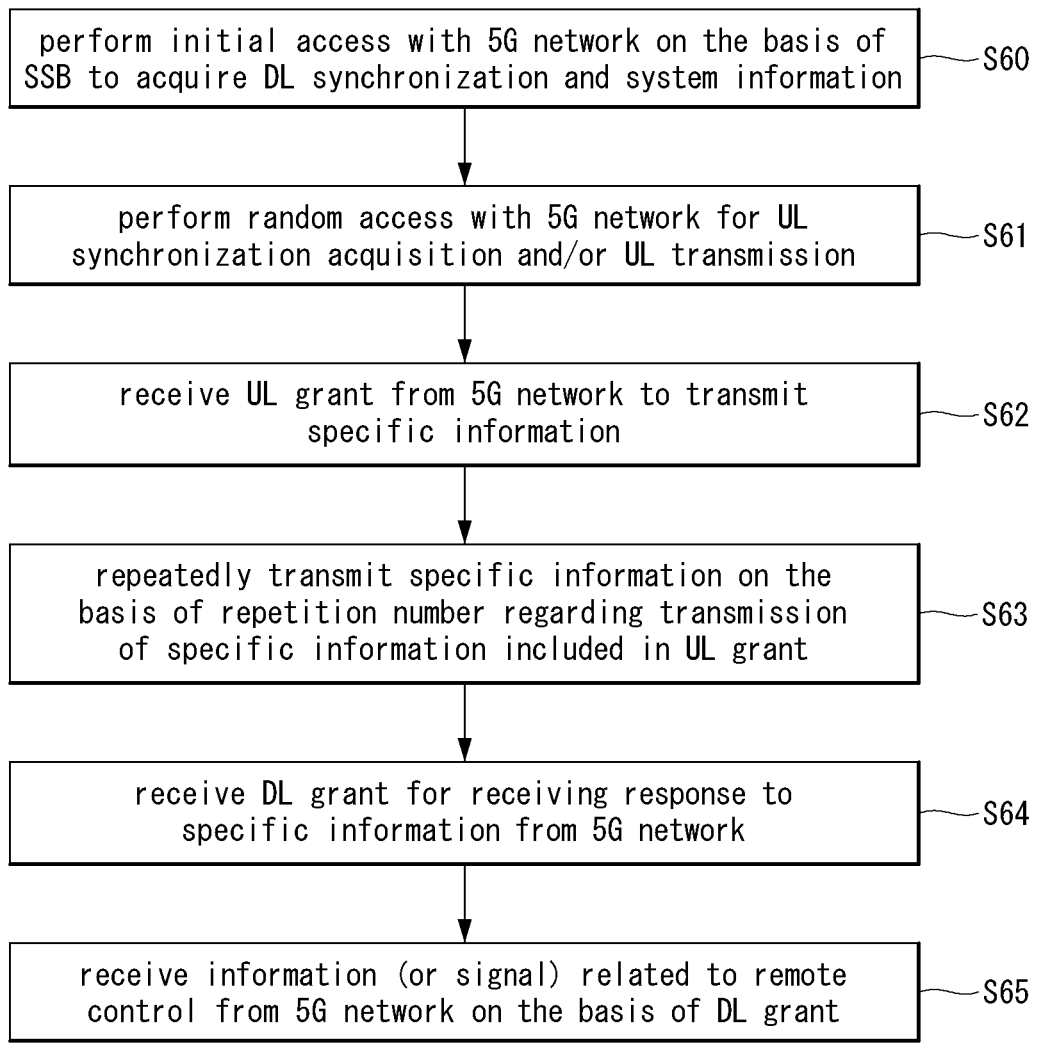

[FIG 9]
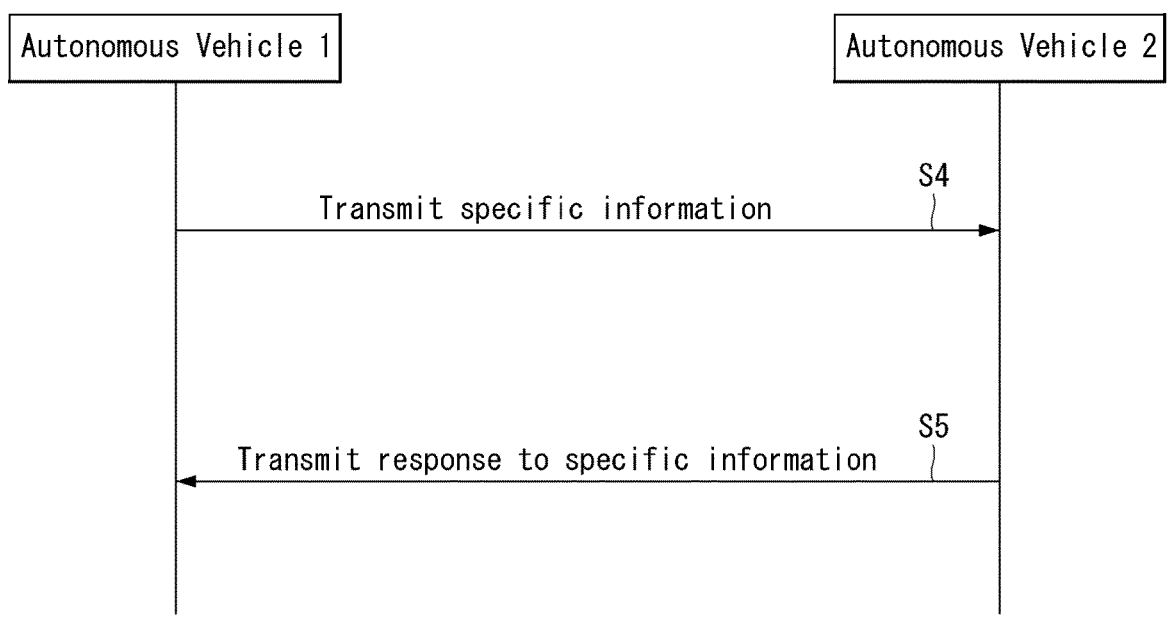

[FIG 10]
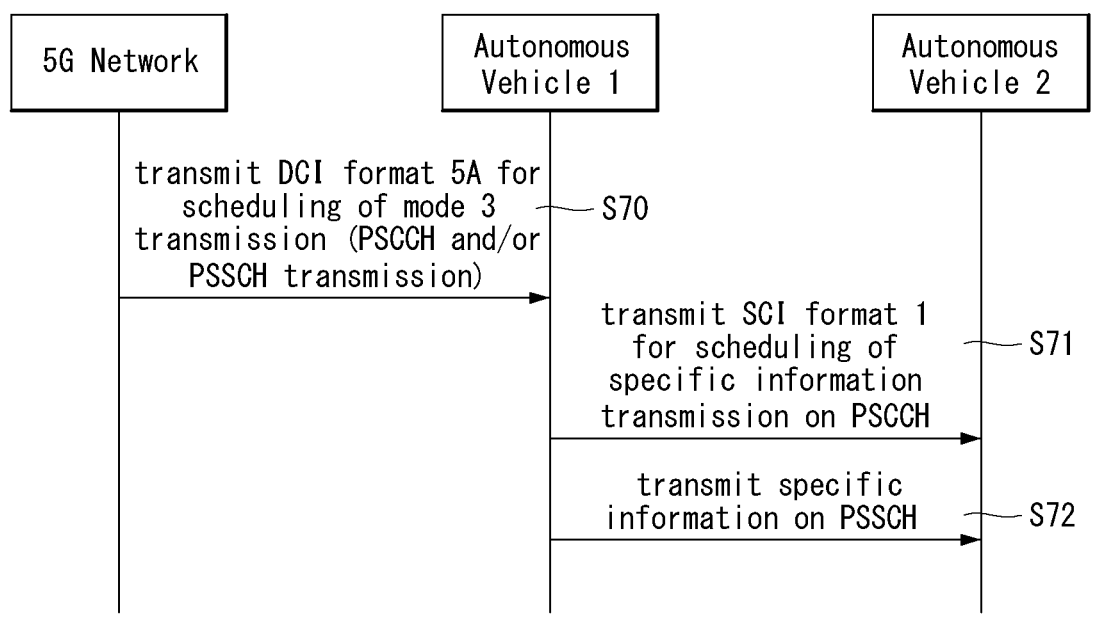

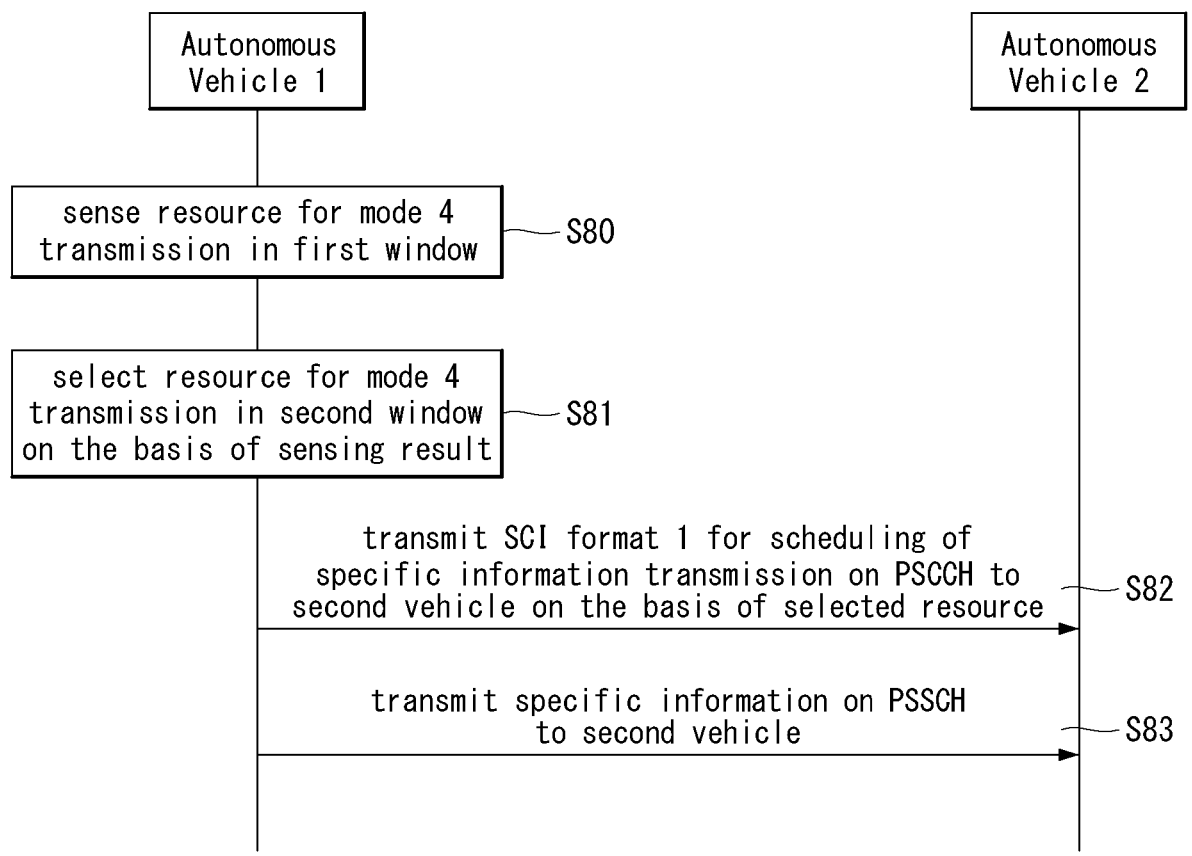
[FIG 11]

[FIG 12]
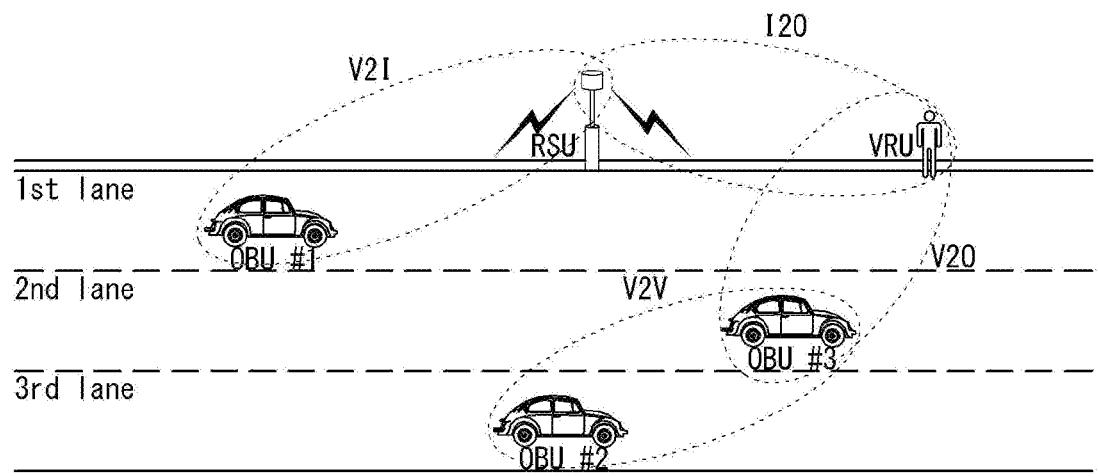

[FIG 13]
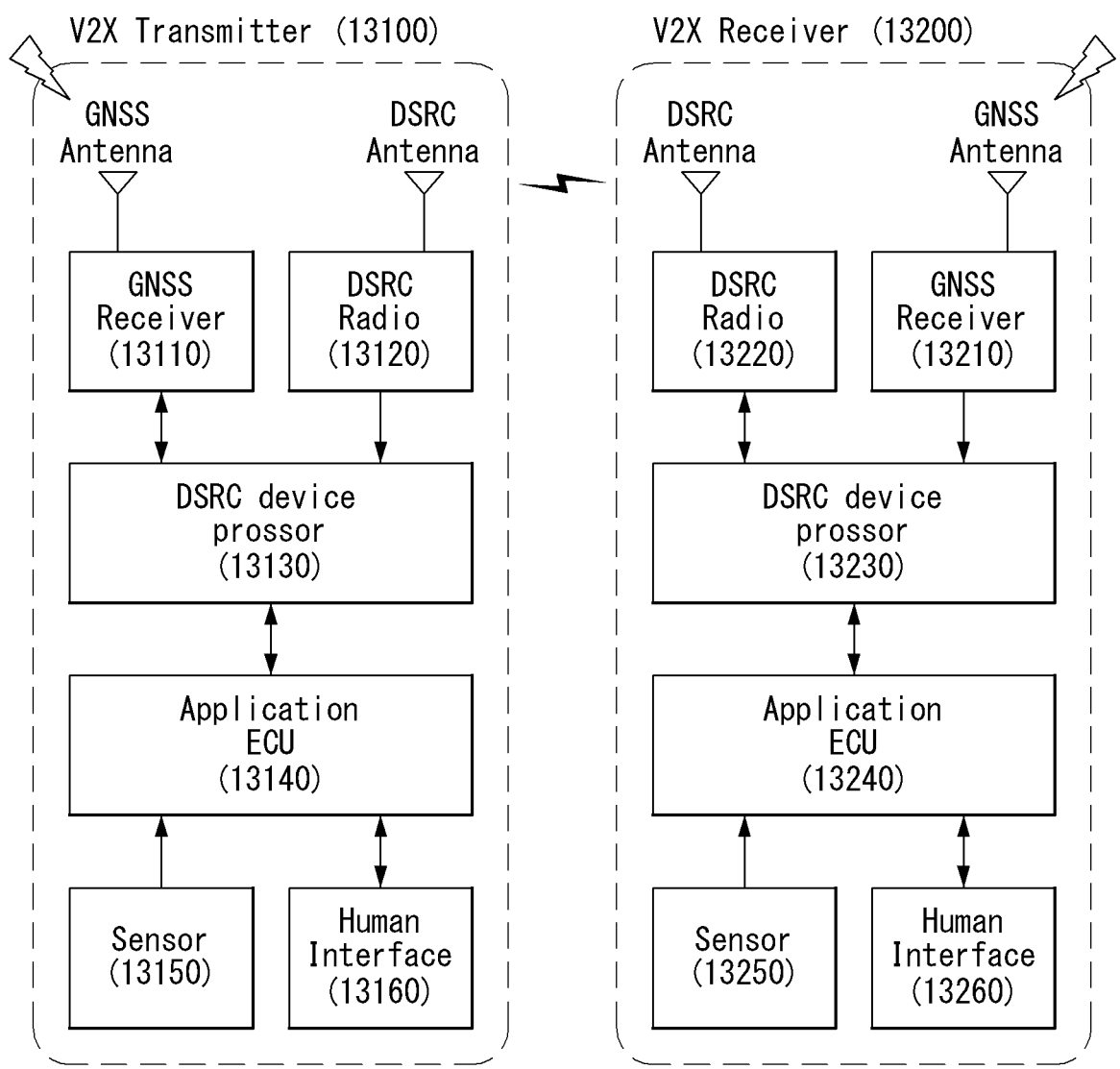

[FIG 14]
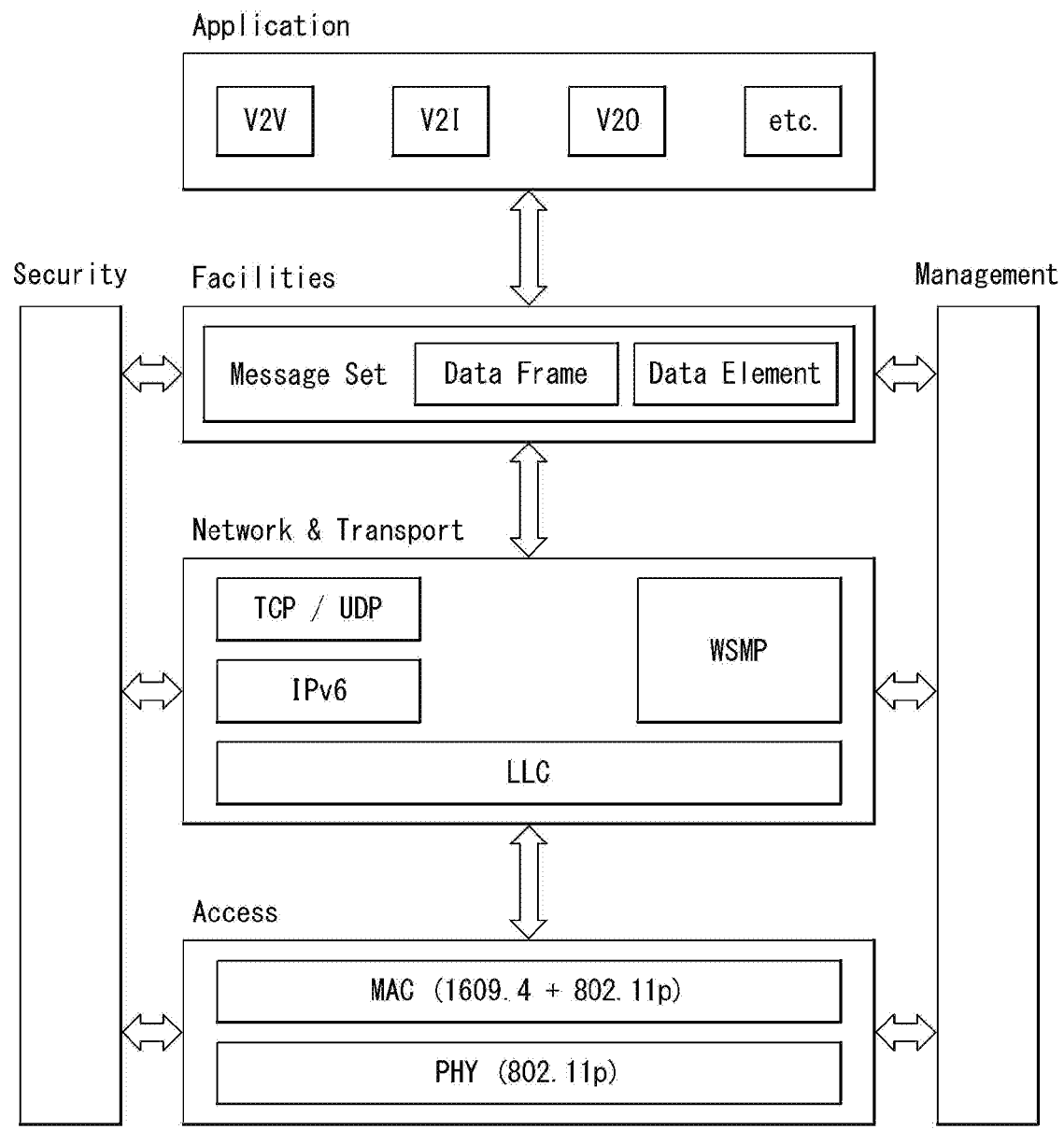

[FIG 15]
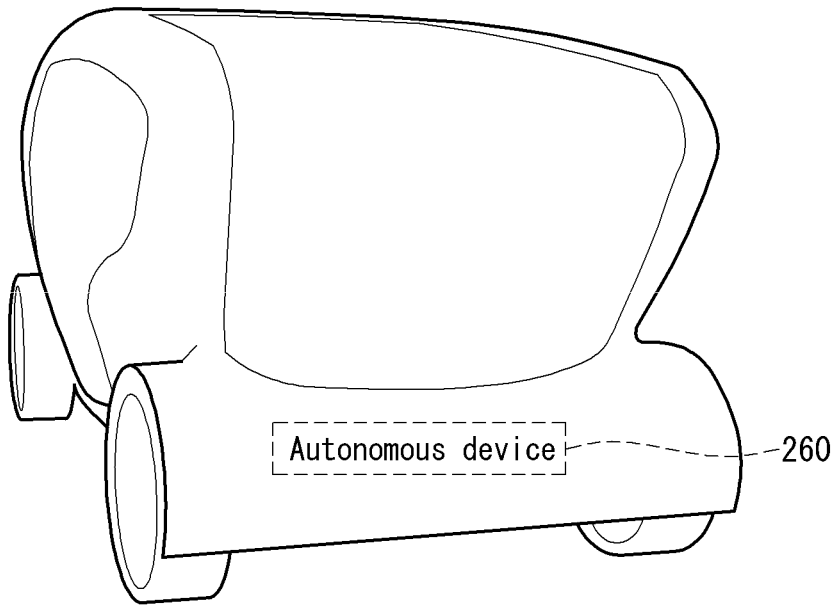
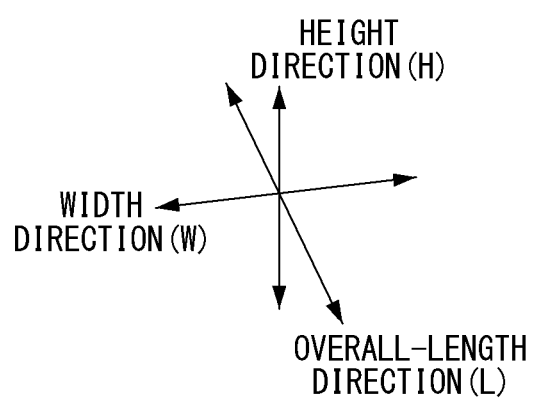

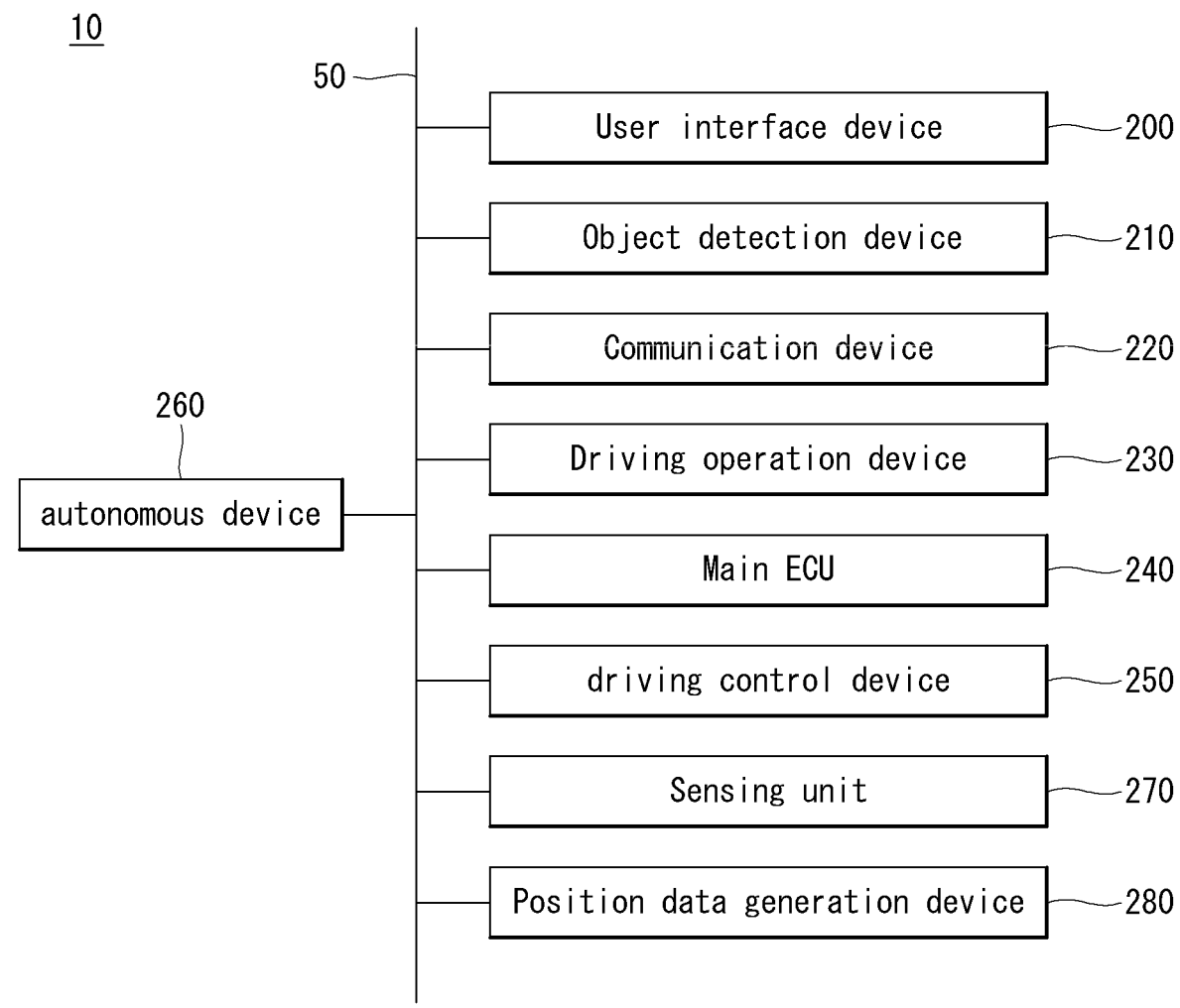

[FIG 17]
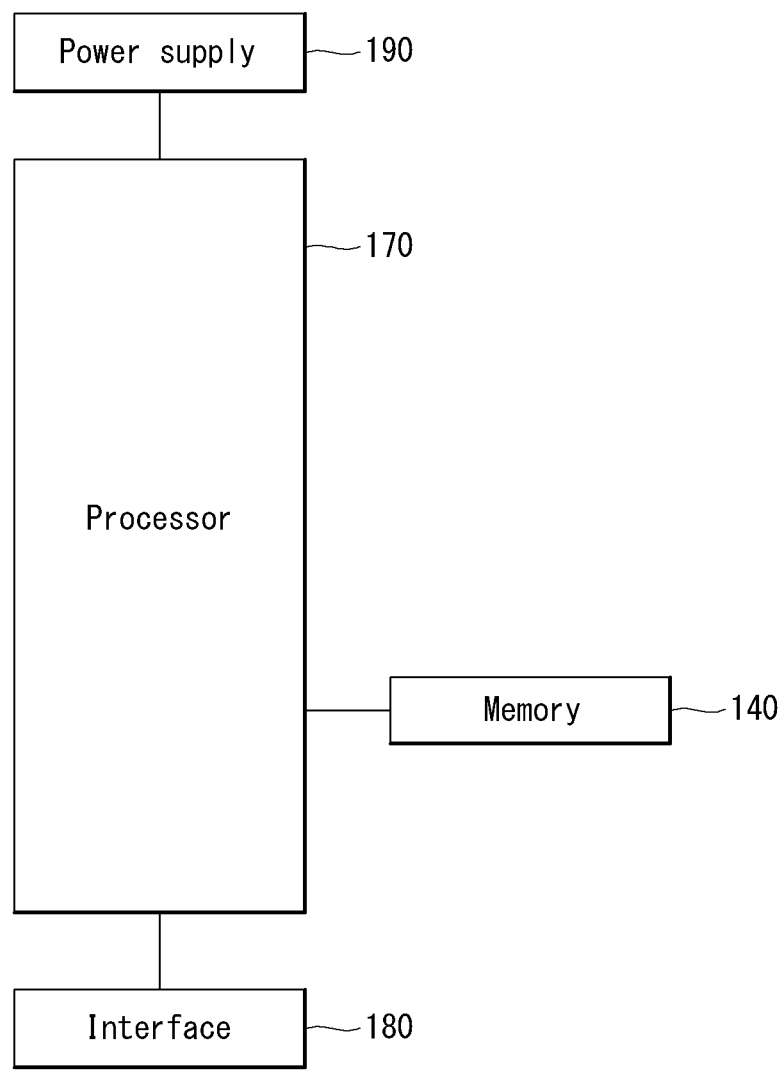

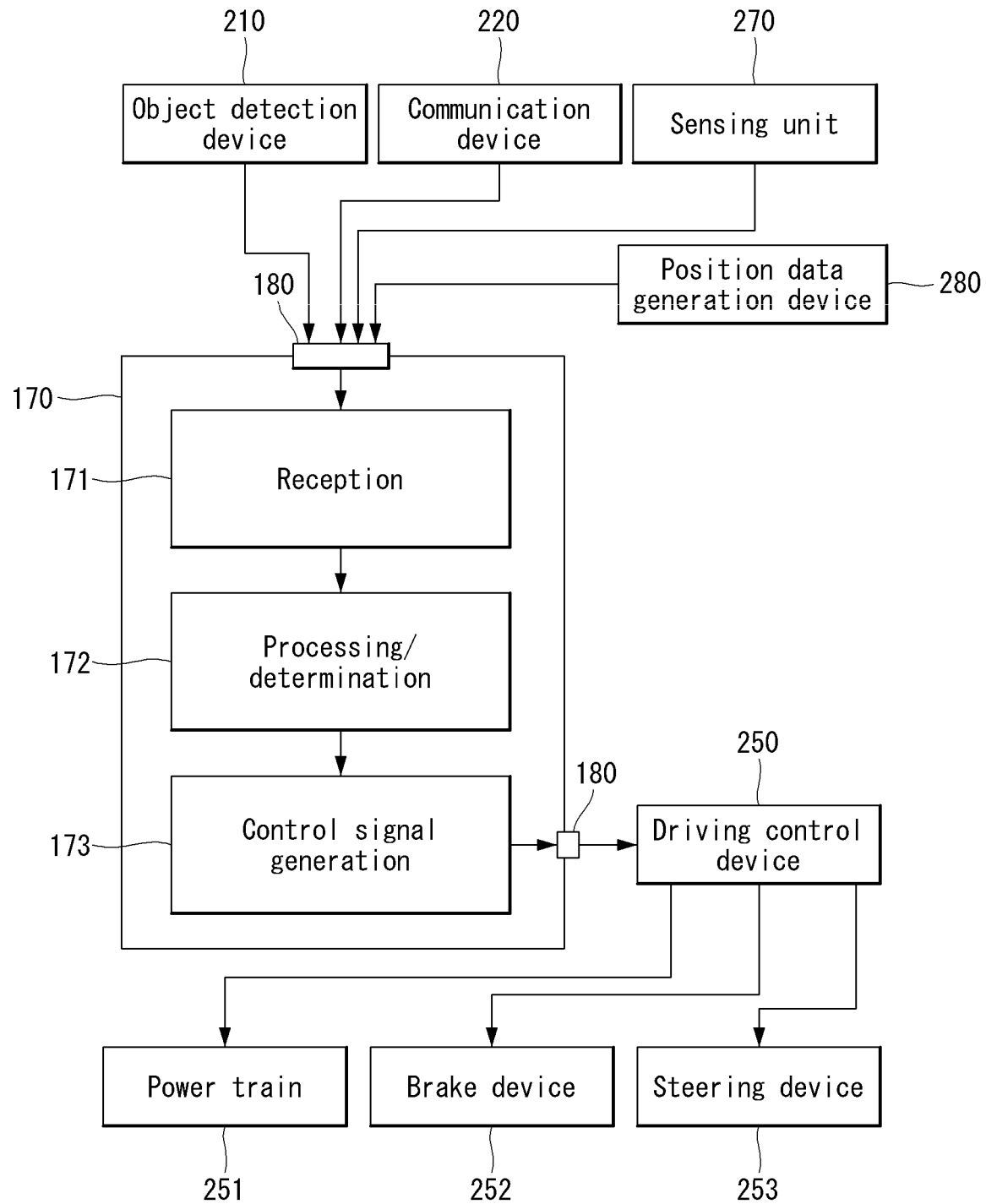
[FIG 18]

[FIG 19]
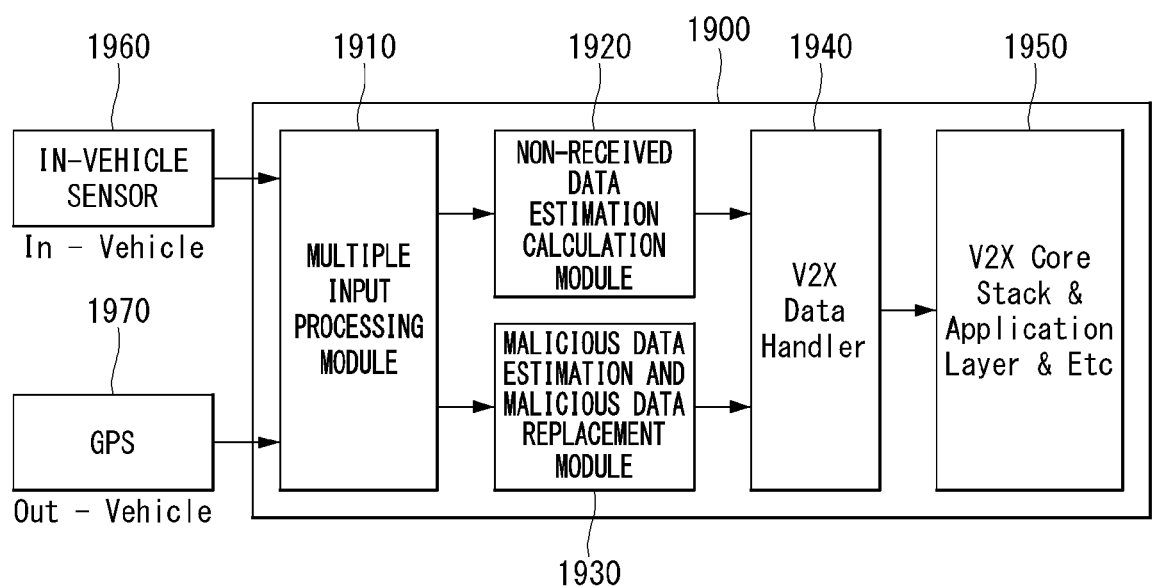

[FIG 20]

ASN.1 Representation:
```
BSMcoreData ::= SEQUENCE {
    msgCnt          MsgCount,
    id              TemporaryID,
    secMark         DSecond,
    lat             Latitude,
    long            Longitude,
    elev            Elevation,
    accuracy        PositionalAccuracy,
    transmission    TransmissionState, |
    speed           Speed,
    heading         Heading,
    angle           SteeringWheelAngle,
    accelSet        AccelerationSet4Way,
    brakes          BrakeSystemStatus,
    size            VehicleSize
```

Data Element from sensor

[FIG 21]
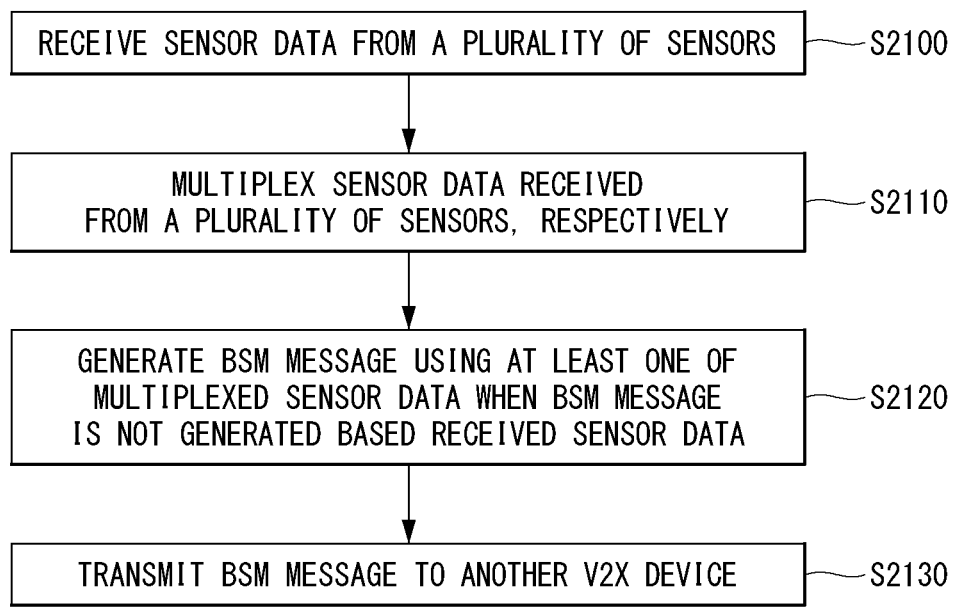

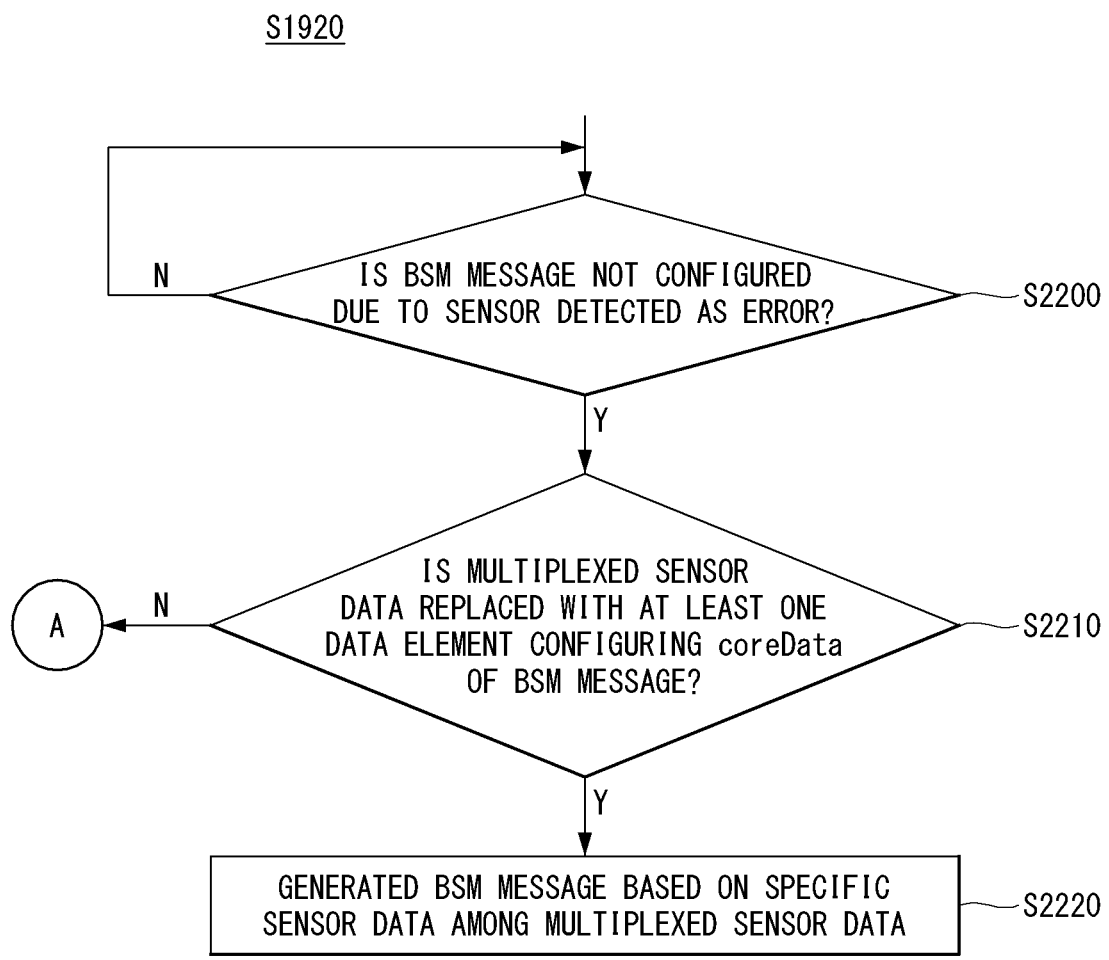
[FIG 22]

[FIG 23]
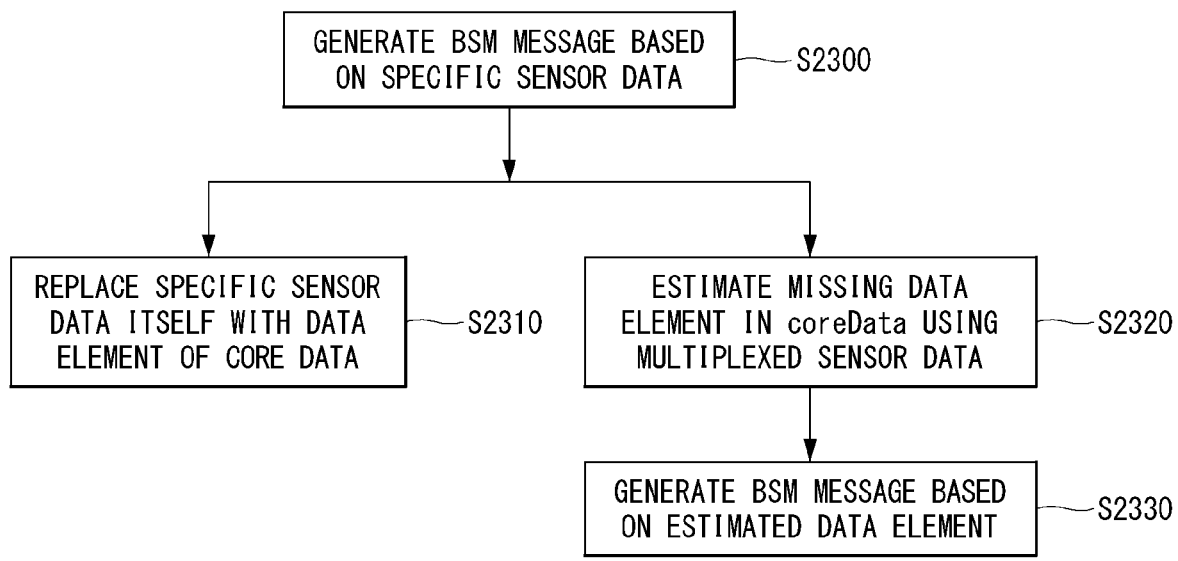

[FIG 24]
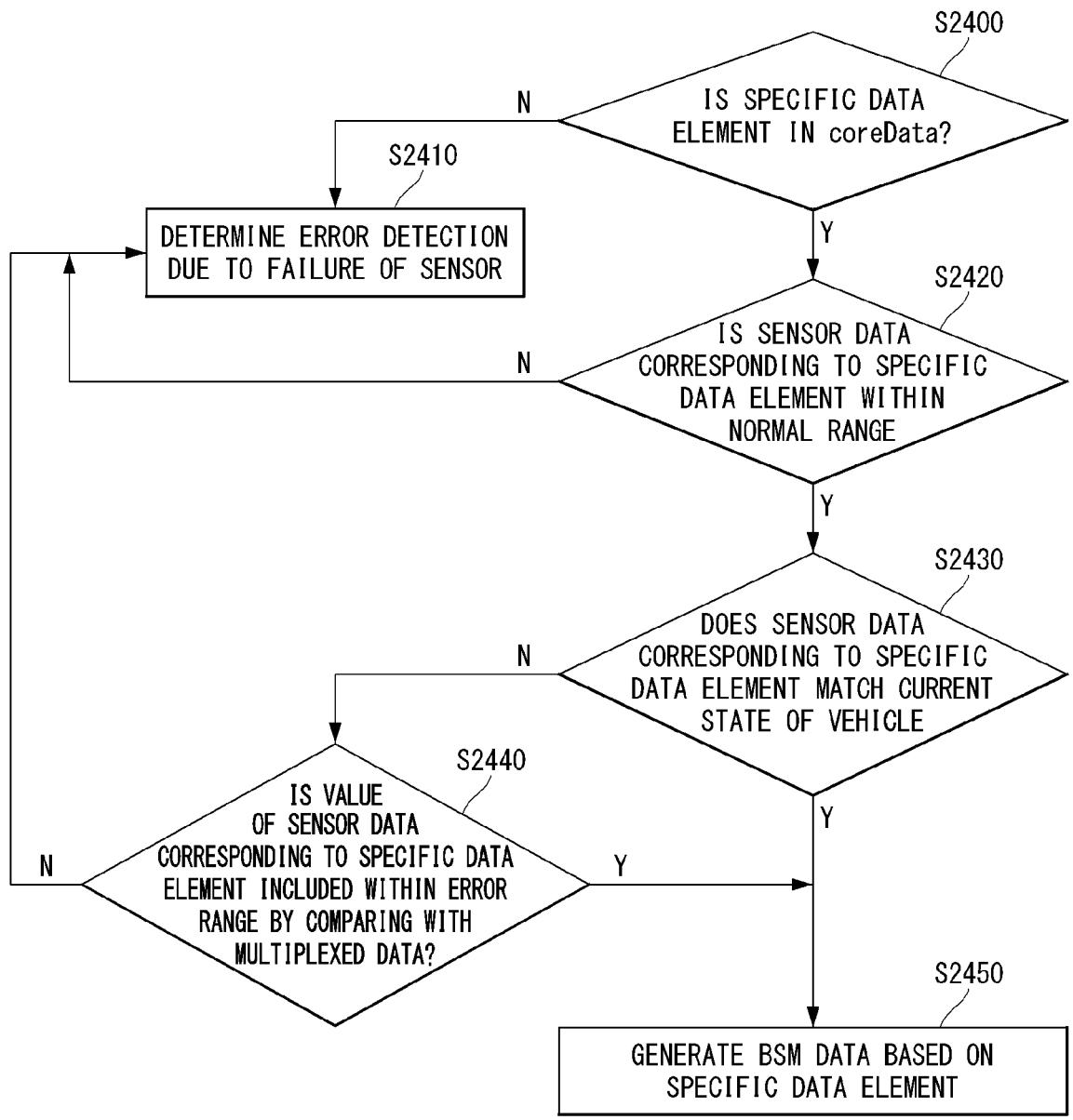

METHOD OF TRANSMITTING BSM MESSAGE OF V2X COMMUNICATION DEVICE PROVIDED IN VEHICLE IN AUTONOMOUS DRIVING SYSTEM

CROSS-REFERENCE TO RELATED APPLICATIONS

This application is a National Stage application under 35 U.S.C. § 371 of International Application No. PCT/KR2019/009539, filed on Jul. 31, 2019. The disclosures of the prior applications are incorporated by reference in their entirety.

TECHNICAL FIELD

The present invention relates to a method of transmitting a BSM message of a V2X communication device provided in a vehicle in an autonomous driving system, and more particularly, to a method of transmitting a BSM message of a V2X communication device capable of configuring the BSM message even when a vehicle sensor fails.

BACKGROUND ART

Recently, vehicle production is shifting from a center of mechanical engineering to complex industrial technologies in which electrical, electronic and communication technologies are fused. In this respect, the vehicle is also called a smart car. The smart cars connect drivers, vehicles, traffic infrastructure and the like to provide a variety of customized mobility services as well as traditional vehicle technologies such as traffic safety/and complexity reduction. This connectivity can be implemented using a vehicle to everything (V2X) communication technology.

In the case of a vehicle, in-vehicle sensors (self-information, wheel speed, or the like) may fail or partially damaged. As a result, if the sensors fail to obtain sensor information, the BSM is not transmitted in the current V2X standard Therefore, there is a problem in that even if only one of the in-vehicle sensors fails, the V2X communication cannot be performed.

DISCLOSURE

Technical Problem

An embodiment of the present invention is to address the above-described needs and/or problems.

In addition, the present invention provides a method of transmitting BSM data of a V2X communication device to enhance stability of a V2X system through sensor multiplexing in an autonomous driving system.

In addition, the present invention provides a method of transmitting BSM data of a V2X communication device capable of correcting errors occurring between sensors.

Technical Solution

According to an aspect of the present invention, a method of transmitting a BasicSafetyMessage (BSM) message of a vehicle to everything (V2X) communication device provided in a vehicle in an autonomous driving system include: receiving sensor data from a plurality of sensors provided in the vehicle; multiplexing the sensor data received from the plurality of sensors, respectively; generating the BSM message using at least one of the multiplexed sensor data when the BSM data is not generated based on the received sensor data; and transmitting the BSM message.

The generating of the BSM message may further include: determining whether the BSM message is not generated by detecting that at least one of the plurality of sensors is an error; determining whether at least one of the multiplexed sensor data replaces at least one data element configuring coreData of the BSM message when it is determined that the error is detected; and generating the BSM data based on a specific sensor data among the multiplexed sensor data when the at least one data element is replaced.

In the generating of the BSM message based on the specific sensor data, the specific sensor data itself may be replaced with the data element of the coreData.

The generating of the BSM message based on the specific sensor data may further include: estimating a missing data element in the coreData using at least one of the plurality of multiplexed sensor data; and generating of the BSM message based on the estimated data element.

The method of transmitting a BSM message of a V2X communication device may further include: determining that the error is detected due to a failure of the specific sensor among the plurality of sensors when a specific data element does not exist in the core data.

The method of transmitting a BSM message of a V2X communication device may further include: determining whether a sensor data corresponding to the specific data element existing in the core data is a data in a normal range; and determining that the error is detected due to the failure of the specific sensor when the sensor data is out of the normal range.

The method of transmitting a BSM message of a V2X communication device may further include: determining that the error is detected when the sensor data corresponding to the specific data element existing in the core data erroneously reflects a current state of the vehicle.

The method of transmitting a BSM message of a V2X communication device may further include: generating the BSM message using a value of the sensor data when the value of the sensor data corresponding to the specific data element is included in a preset error range by comparing with the multiplexed sensor data.

The multiplexed data may further include a GPS data received from an external device.

In the generating of the BSM message, the BSM message may be generated based on a GPS coordinate of the vehicle, a change trend of the GPS coordinate, and a movement path of the vehicle on the basis of the GPS data.

The method of transmitting a BSM message of a V2X communication device may further include: receiving downlink control information (DCI) used to schedule a transmission of the BSM message from a network, in which the BSM message may be transmitted to the network based on the DCI.

The method of transmitting a BSM message of a V2X communication device may further include: performing an initial access procedure with the network based on a synchronization signal block (SSB), in which the BSM message may be transmitted through PUSCH, and the SSB and DM-RS of the PUSCH may be QCLed for QCL type D.

The method of transmitting a BSM message of a V2X communication device may further include: receiving DCI format 5A for scheduling of mode 3 transmission (PSCCH and/or PSSCH transmission) from a network; transmitting SCI format 1 for scheduling of the transmission of the BSM message to another vehicle on PSCCH; and transmitting the BSM message to the another vehicle on PSSCH.

The method of transmitting a BSM message of a V2X communication device may further include: sensing a resource for mode 4 transmission in a first window; selecting the resource for the mode 4 transmission in a second window based on the sensed result; transmitting SCI format 1 for scheduling of a transmission of the BSM message based on the selected resource to another vehicle on PSCCH; and transmitting the BSM message to the another vehicle on PSSCH.

Advantageous Effects

The present invention can enhance the stability of the V2X system through the sensor multiplexing in the autonomous driving system.

In addition, the present invention can correct errors and the like occurring between the sensors.

Effects which can be achieved by the present invention are not limited to the above-mentioned effects. That is, other objects that are not mentioned may be obviously understood by those skilled in the art to which the present invention pertains from the following description.

DESCRIPTION OF DRAWINGS

The accompanying drawings, which are included as part of the detailed description in order to provide a thorough understanding of the present invention, provide examples of the present invention and together with the description, describe the technical features of the present invention.

FIG. 1 is a block diagram of a wireless communication system to which methods proposed in the disclosure are applicable.

FIG. 2 shows an example of a signal transmission/reception method in a wireless communication system.

FIG. 3 shows an example of basic operations of an autonomous vehicle and a 5G network in a 5G communication system.

FIG. 4 illustrates an example of application operation of an autonomous vehicle and a 5G network in a 5G communication system.

FIGS. 5 to 8 show an example of an operation of an autonomous vehicle using 5G communication.

FIG. 9 illustrates an example of a basic operation between a vehicle and a vehicle using 5G communication.

FIGS. 10 to 11 illustrate an example of an application operation between a vehicle and a vehicle using 5G communication.

FIG. 12 illustrates an intelligent transport system (ITS) according to an embodiment of the present invention.

FIG. 13 illustrates a V2X transmission/reception system according to an embodiment of the present invention.

FIG. 14 illustrates a configuration of a V2X system according to another embodiment of the present invention.

FIG. 15 illustrates a vehicle according to an embodiment of the present invention.

FIG. 16 is a control block diagram of the vehicle according to an embodiment of the present invention.

FIG. 17 is a control block diagram of an autonomous device according to an embodiment of the present invention.

FIG. 18 is a flowchart of a signal of an autonomous vehicle according to an embodiment of the present invention.

FIG. 19 is a diagram for describing an example of a block configuration diagram of a V2X communication device according to an embodiment of the present invention.

FIG. 20 is a diagram for describing an example of data elements of a BSM message transmitted in the V2X communication device according to the embodiment of the present invention.

FIG. 21 is a flowchart illustrating a method of transmitting a BSM message of a V2X communication device according to an embodiment of the present invention.

FIG. 22 is a diagram for describing an example of generating the BSM message of the V2X communication device according to the embodiment of the present invention.

FIG. 23 is a diagram for describing another example of generating the BSM message of the V2X communication device according to the embodiment of the present invention.

FIG. 24 is a diagram for describing another example of generating the BSM message of the V2X communication device according to the embodiment of the present invention.

The accompanying drawings, which are included as part of the detailed description to assist understanding of the invention, illustrate embodiments of the invention and explain the technical features of the invention together with the detailed description.

MODE FOR INVENTION

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

A. Example of Block Diagram of UE and 5G Network

FIG. 1 is a block diagram of a wireless communication system to which methods proposed in the disclosure are applicable.

Referring to FIG. 1, a device (autonomous device) including an autonomous module is defined as a first communication device (110 of FIG. 1), and a processor 111 can perform detailed autonomous operations.

A 5G network including another vehicle communicating with the autonomous device is defined as a second communication device (120 of FIG. 1), and a processor 121 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, a terminal or user equipment (UE) may include a vehicle, a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user.

For example, the HMD may be used to realize VR, AR or MR. Referring to FIG. 1, the first communication device 110 and the second communication device 120 include processors 111 and 121, memories 114 and 124, one or more Tx/Rx radio frequency (RF) modules 115 and 125, Tx processors 112 and 122, Rx processors 113 and 123, and antennas 116 and 126. The Tx/Rx module is also referred to as a transceiver. Each Tx/Rx module 115 transmits a signal through each antenna 126. The processor implements the aforementioned functions, processes and/or methods. The processor 121 may be related to the memory 124 that stores program code and data. The memory may be referred to as a computer-readable medium. More specifically, the Tx processor 112 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 110 in a way similar to that described in association with a receiver function in the second communication device 120. Each Tx/Rx module 125 receives a signal through each antenna 126. Each Tx/Rx module provides RF carriers and information to the Rx processor 123. The processor 121 may be related to the memory 124 that stores program code and data. The memory may be referred to as a computer-readable medium.

B. Signal Transmission/Reception Method in Wireless Communication System

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. Along sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-Resource-SetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to "beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by servingCellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present invention which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

FIG. 4 shows an example of an application operation of an autonomous vehicle and the 5G network in a 5G communication system.

The autonomous vehicle carries out an initial access procedure with the 5G network (S20).

The initial access procedure includes a cell search for acquiring a downlink (DL) synchronization, and process for acquiring system information, and the like, which will be described in detail in paragraph F.

Then, the autonomous vehicle carries out a random access procedure with the 5G network (S21).

The random access procedure includes a process of transmitting a preamble for uplink (UL) synchronization acquisition or UL data transmission, receiving a random access response, and the like, which will be described in detail in paragraph G.

The 5G network transmits a UL grant for scheduling transmission of specific information to the autonomous vehicle (S22).

The UL Grant reception includes a time/frequency resource scheduling for UL data transmission to the 5G network, which will be described in detail in paragraph H.

Also, the autonomous vehicle transmits specific information to the 5G network on the basis of the UL grant (S23).

The 5G network determines whether the vehicle is remotely controlled (S24).

Then, the autonomous vehicle receives a DL grant via a physical downlink control channel to receive a response to specific information from the 5G network (S25).

The 5G network transmits information (or a signal) related to remote control to the autonomous vehicle on the basis of the DL grant (S26).

Meanwhile, FIG. 4 shows an example in which the initial access procedure or the random access procedure and the DL grant receiving process of the autonomous vehicle and 5G communication are combined through the process of S20 to S26, but the present invention is not limited thereto.

For example, the initial access procedure and/or the random access procedure may be performed through the steps S20, S22, S23, S24, and S25. Also, for example, the initial access procedure and/or the random access procedure may be performed through steps S21, S22, S23, S24, and S26. Also, a process of combining an AI operation and a downlink grant receiving process may be performed through steps S23, S24, S25, and S26.

In FIG. 4, an operation of the autonomous vehicle is exemplarily described through steps S20 to S26, but the present invention is not limited thereto.

For example, the operation of the autonomous vehicle may be performed by selectively combining steps S20, S21, S22, and S25 with steps S23 and S26. Also, for example, the operation of the autonomous vehicle may include steps S21, S22, S23, and S26.

For example, the operation of the autonomous vehicle may include steps S20, S21, S23, and S26. For example, the operation of the autonomous vehicle may include steps S22, S23, S25, and S26.

FIGS. 5 to 8 show an example of an operation of an autonomous vehicle using 5G communication.

Referring to FIG. 5, the autonomous vehicle including an autonomous driving module performs an initial access procedure with a 5G network on the basis of an synchronization signal block (SSB) to acquire DL synchronization and system information (S30).

Also, the autonomous vehicle carries out a random access procedure with the 5G network for UL synchronization acquisition and/or UL transmission (S31).

Also, the autonomous vehicle receives UL grant from the 5G network to transmit specific information (S32).

Also, the autonomous vehicle transmits the specific information to the 5G network on the basis of the UL grant (S33).

Also, the autonomous vehicle receives a DL grant for receiving a response to specific information from the 5G network (S34).

Also, the autonomous vehicle receives information (or signal) related to remote control from the 5G network on the basis of the DL grant (S35).

A beam management (BM) process may be added to step S30, a beam failure recovery process related to physical random access channel (PRACH) transmission may be added to S31. A QCL in connection with a beam reception direction of a PDCCH including the UL grant may be added to step S32, and a QCL relationship in connection with a beam transmission direction of a physical uplink control channel (PUCCH)/physical uplink shared channel (PUSCH) including the specific information may be added to step S33. Also, a QCL relationship in connection with the beam reception direction of the PDCCH including the DL grant may be added to step S34, and details thereof will be described in paragraph I.

Next, referring to FIG. 6, the autonomous vehicle carries out an initial access procedure with the 5G network on the basis of the SSB to acquire DL synchronization and system information (S40).

Also, the autonomous vehicle carries out a random access procedure with the 5G network for UL synchronization acquisition and/or UL transmission (S41).

Also, the autonomous vehicle transmits the specific information to the 5G network on the basis of a configured grant (S42). The process of the configured grant instead of performing the UL grant from the 5G network will be described in detail in paragraph H.

The autonomous vehicle receives information (or a signal) related to remote control from the 5G network on the basis of the configured grant (S43).

Next, referring to FIG. 7, the autonomous vehicle carries out an initial access procedure with the 5G network on the basis of the SSB to acquire DL synchronization and system information (S50).

The autonomous vehicle carries out a random access procedure with the 5G network for UL synchronization acquisition and/or UL transmission (S51).

Then, the autonomous vehicle receives DownlinkPreemption IE from the 5G network (S52).

Then, the autonomous vehicle receives the DCI format 2_1 including a preliminary indication from the 5G network on the basis of DownlinkPreemption IE (S53).

The autonomous vehicle does not (or expects or assumes) reception of eMBB data in a resource (PRB and/or OFDM symbol) indicated by the pre-emption indication (S54).

The operation related to the preemption indication will be described in detail in paragraph J.

Then, the autonomous vehicle receives UL grant from the 5G network to transmit specific information (S55).

Then, the autonomous vehicle transmits specific information to the 5G network on the basis of the UL grant (S56).

The autonomous vehicle receives a DL grant for receiving a response to specific information from the 5G network (S57).

The autonomous vehicle receives the information (or signal) related to remote control from the 5G network on the basis of the DL grant (S58).

Next, referring to FIG. 8, the autonomous vehicle carries out an initial access procedure with the 5G network on the basis of the SSB to acquire DL synchronization and system information (S60).

The autonomous vehicle carries out a random access procedure with the 5G network for UL synchronization acquisition and/or UL transmission (S4).

The autonomous vehicle receives a UL grant from the 5G network to transmit specific information (S5).

The UL grant includes information on the number of repetitions regarding transmission of the specific information, and the specific information is repeatedly transmitted on the basis of the information on the number of repetitions (S63).

The autonomous vehicle transmits specific information to the 5G network on the basis of the UL grant.

The repeated transmission of the specific information is performed through frequency hopping, first specific information may be transmitted in a first frequency resource and second specific information may be transmitted in a second frequency resource.

The specific information may be transmitted through a narrowband of 6RB (Resource Block) or 1RB (Resource Block).

Then, the autonomous vehicle receives a DL grant for receiving a response to specific information from the 5G network (S64).

Then, the autonomous vehicle receives the information (or signal) related to remote control from the 5G network on the basis of the DL grant (S65).

The mMTC described in FIG. 8 will be described in detail in paragraph K.

C. Autonomous driving operation between vehicles using 5G communication

FIG. 9 illustrates an example of a basic operation between vehicles using 5G communication.

A first vehicle transmits specific information to a second vehicle (S4).

The second vehicle transmits a response to the specific information to the first vehicle (S5).

Here, details of transmission/reception of the specific information and the response to the specific information may be referred to the contents disclosed in paragraph M describing the operation of V2X communication, and it means that FIG. 8 and the contents disclosed in M may be combined to be applied.

Meanwhile, a configuration of a vehicle-to-vehicle application operation may vary depending on whether the 5G network is involved directly (sidelink communication transmission mode 3) or indirectly (sidelink communication transmission mode 4) in resource allocation for the specific information and the response to the specific information.

FIGS. 10 to 11 illustrate an example of a vehicle-to-vehicle application operation using 5G communication.

FIG. 10 shows an embodiment in which the 5G network directly participates in resource allocation of signal transmission/reception.

The 5G network may transmit DCI format 5A to the first vehicle for scheduling of mode 3 transmission (PSCCH and/or PSSCH transmissions) (S70).

Here, the physical sidelink control channel (PSCCH) is a 5G physical channel for scheduling specific information transmission, and physical sidelink shared channel (PSSCH) is a 5G physical channel for transmitting specific information.

The first vehicle transmits SCI format 1 for scheduling transmission of specific information to the second vehicle on the PSCCH (S71).

Also, the first vehicle transmits specific information on the PSSCJ to the second vehicle (S72).

FIG. 11 shows an embodiment in which a 5G network is indirectly involved in resource allocation of signal transmission/reception.

Referring to FIG. 11, the first vehicle senses a resource for mode 4 transmission in a first window (S80).

Then, the first vehicle selects a resource for mode 4 transmission in a second window on the basis of a sensing result (S81).

Here, the first window refers to a sensing window and the second window refers to a selection window.

The first vehicle transmits SCI format 1 for scheduling transmission of specific information on the PSCCH to the second vehicle on the basis of the selected resource (S82).

Then, the first vehicle transmits specific information on the PSSCH to the second vehicle (S83).

FIG. 12 illustrates an intelligent transport system (ITS) according to an embodiment of the present invention.

The intelligent transport system means a system that provides an efficient and safe transport service by applying information and communication technology such as an electronic control and communication device to transportation means such as automobiles, buses, trains, or the like and transportation facilities including traffic lights, an electronic display board, and the like. In order to support the ITS, vehicle to everything (V2X) technology may be used. V2X communication technology represents communication technology between vehicles or between the vehicle and a peripheral device.

A vehicle that supports V2X communication is equipped with the OBU and the OBU includes a dedicated short-range communication (DSRC) communication modem. An infrastructure including a V2X module installed around a road, such as the traffic light, may be referred to as an RSU. Vulnerable road users (VRUs) are transportation weakness and pedestrians, bicycles, wheelchairs, etc. may correspond to the VRUs. The VRU may perform V2X communication.

Vehicle to vehicle (V2V) refers to inter-vehicle communication or communication technology including a V2X communication apparatus. Vehicle to infra-structure (V2I) refers to communication or communication technology between the vehicle and an infra-structure including the V2X communication apparatus. Besides, communication between the vehicle and the transportation weakness may refer to V2O and communication between the infra-structure and the transportation weakness may refer to I2O.

FIG. 13 illustrates a V2X transmission/reception system according to an embodiment of the present invention.

A V2X transmission/reception system includes a V2X transmitter 13100 and a V2X receiver 13200 and the transmitter and the receiver are distinguished from each other according to roles of transmitting and receiving data and are not different from each other in a configuration of a device. The V2X transmitter 13100 and the V2X receiver 13200 are both the V2X communication apparatuses.

The V2X transmitter 13100 includes a Global Navigation Satellite System (GNSS) receiver 13110, a DSRC radio 13120, a DSRC device processor 13130, an application Electronic Control Unit (ECU) 13140, a sensor 13150, and a human interface 13160.

The DSRC radio 13120 may perform communications based on the IEEE 802.11 standard based on a Wireless Local Area Network (WLAN) and/or the Wireless Access in Vehicular Environments (WAVE) standard of the Society of Automotive Engineers (SAE). The DSRC radio 13120 may perform operations of a physical layer and an MAC layer.

The DSRC device processor 13130 may decode a message received by the DSRC radio 13120 or decode a message to be transmitted. The GNSS receiver 13110 may process GNSS and acquire positional information and temporal information. As an example, the GNSS receiver 13110 may become a Global Positioning System (GPS) device.

The application ECU 13140 may be a microprocessor for providing a specific application service. The application ECU may generate an operation/message based on sensor information and a user input in order to provide a service and transmit/receive the message by using the DSRC device processor. The sensor 13150 may obtain vehicle status and ambient sensor information. The human interface 13160 may receive a user's input or display/provide the message through an interface such as an input button or a monitor.

The V2X receiver 13200 includes a Global Navigation Satellite System (GNSS) receiver 13210, a DSRC radio 13220, a DSRC device processor 13230, an application Electronic Control Unit (ECU) 13240, a sensor 13250, and a human interface 13260. The aforementioned description of the configuration of the V2X transmitter 13100 is applied to the configuration of the V2X receiver 13200.

The DSRC radio and the DSRC device processor correspond to one embodiment of a communication unit. The communication unit may perform communication based on cellular communication technology such as 3GPP and Long Term Evolution (LTE).

FIG. 14 illustrates a configuration of a V2X system according to an embodiment of the present invention.

FIG. 14 illustrates a hierarchical architecture corresponding to an embodiment of the V2X system. 3. As an embodiment, the North American V2X system uses IEEE 802.11 PHY technology and MAC technology, and further may use the MAC technology of IEEE 1609.4. In the network/transport layer technology, the technology of the IEEE802.2 standard may be applied to an LLC block and the IEEE 1609.3 technology may be applied to a WAVE short message protocol (WSMP). The facility layer may use a message set of a J2735 standard of SAE and the application layer may use an application defined for V2V, V2I, and V2O in a J2945 standard.

The application layer may perform a function to implement and support the use-case. The application may be optionally used according to the use-case. A system requirement of each use-case may be defined in the J2945 standard. J2945/1 defines an application of V2V technology such as V2V safety communication.

A J2945/1 document defines applications including emergency electronic brake lights (EEBL), forward crash warning (FCW), blind spot warning (BSW), lane change warning (LCW), intersection movement assist (IMA), and control loss warning (CLW). As an embodiment, FCW technology is V2V safety communication technology that warns of a collision with a preceding vehicle. When a vehicle equipped with the V2X communication apparatus makes emergency stop or crashes, an FCW safety message may be transmitted in order to prevent a collision of a subsequent vehicle. The subsequent vehicle may receive FCW messages and alert a driver or perform such controls as speed deceleration or lane change. In particular, even when there is another vehicle between a stopped vehicle and a driving vehicle, it is possible to determine a state of the stopped through the FCW. The FCW safety message may include positional information (latitude, longitude, and lane) of the vehicle, vehicle information (vehicle type, length, direction, speed), and event information (stop, sudden stop, and slow down) and the information may be generated by the request of the facility layer.

The facility layer may correspond to OSI layer 5 (session layer), layer 6 (presentation layer), or layer 7 (application layer). The facility layer may generate the message set according to a situation in order to support the application. The message set may be defined in the J2735 standard and described/decoded through ASN.1. The message set may include a BasicSafetyMessage message, a MapData message, an SPAT message, CommonSafetyRequest message, an EmergencyVehicleAlert message, an IntersectionCollision message, a ProbeVehicleData message, a RoadSideAlert message, and a PersonalSafetyMessag message.

The facility layer collects the information to be transmitted from the upper layer to generate the message set. The message set may be displayed in an Abstract Syntax Notation 1 (ASN.1) scheme. The ASN.1 as a notation used to describe the data structure may also set an encoding/decoding rule. The ASN.1 does not depend on specific devices, a data representation scheme, programming languages, hardware platforms, and so on. The ASN.1 as a language for describing data regardless of platform is a joint standard between Consultative Committee on International Telegraphy and Telephony (CCITT) X.208 and International Organization for Standardization, (ISO) 8824.

The message set as a collection of messages related to V2X operations and there is a message set appropriate to the context of the upper application. The message set may be expressed in a format of the data frame and may include at least one element. Each element may include the data frame or a data element.

The data frame represents two or more data sequences. The data frame may become a sequence structure of the data element or a sequence structure of the data frame. As an embodiment, DV_vehicleData as a data frame structure representing information of a vehicle may include a plurality of data elements (for example, Height, Bumbers, mass, and trailerweight). The data element defines a description of the data element. As an embodiment, an element called Height used in the data frame is defined in DE_VehicleHeight and may express a height of the vehicle. As an embodiment, the height of the vehicle may be expressed from 0 to 127, and an LBS unit may be increased by 5 cm and be expressed up to 6.35 meters.

As an embodiment, a basic safety message (BasicSafetyMessage) may be transmitted. The BasicSafetyMessage as a most basic and important message in the message set is used for periodically transmitting basic information of the vehicle. The corresponding message may include coreData defined as BSMcoreData, PartII which is optional, and regional data. The coreData may include data elements including msgCnt, id, lat, long, elev, speed, deading, break, size, and the like. The coreData uses the data elements to display a message count, ID, latitude, longitude, altitude, speed, direction, a brake, a vehicle size, and so on. The corresponding BSM may generally transmit information corresponding to the coreData in a period of 100 msec (10 times per second).

The network/transport layer may correspond to OSI layer 3 (network layer) and layer 4 (transport layer). A WAVE short message protocol (WSMP) may be used for transmitting a WAVE Short Message (WSM) delivered by the upper layer. Additionally, an IPv6/TCP may be used for processing an IP signal in the related art. The LLC block may adopt the IEEE 802.2 standard and may distinguish IP diagrams from WSM packets.

The access layer may correspond to OSI layer 1 (physical layer) and OSI layer 2 (data link layer). The access layer may use PHY technology and MAC technology of IEEE 802.11 and additionally use MAC technology of IEEE 1609.4 in order to support vehicle communication.

The security entity and the management entity may be connected and operated in all intervals.

The above-described 5G communication technology can be combined with methods proposed in the present invention which will be described later and applied or can complement the methods proposed in the present invention to make technical features of the methods concrete and clear.

Driving (1) Exterior of Vehicle

FIG. 15 is a diagram showing a vehicle according to an embodiment of the present invention.

Referring to FIG. 15, a vehicle 10 according to an embodiment of the present invention is defined as a transportation means traveling on roads or railroads. The vehicle 10 includes a car, a train and a motorcycle. The vehicle 10 may include an internal-combustion engine vehicle having an engine as a power source, a hybrid vehicle having an engine and a motor as a power source, and an electric vehicle having an electric motor as a power source.

The vehicle 10 may be a private own vehicle. The vehicle 10 may be a shared vehicle. The vehicle 10 may be an autonomous vehicle.

(2) Components of Vehicle

FIG. 16 is a control block diagram of the vehicle according to an embodiment of the present invention.

Referring to FIG. 16, the vehicle 10 may include a user interface device 200, an object detection device 210, a communication device 220, a driving operation device 230, a main ECU 240, a driving control device 250, an autonomous device 260, a sensing unit 270, and a position data generation device 280. The object detection device 210, the communication device 220, the driving operation device 230, the main ECU 240, the driving control device 250, the autonomous device 260, the sensing unit 270 and the position data generation device 280 may be realized by electronic devices which generate electric signals and exchange the electric signals from one another.

1) User Interface Device

The user interface device 200 is a device for communication between the vehicle 10 and a user. The user interface device 200 can receive user input and provide information generated in the vehicle 10 to the user. The vehicle 10 can realize a user interface (UI) or user experience (UX) through the user interface device 200. The user interface device 200 may include an input device, an output device and a user monitoring device.

2) Object Detection Device

The object detection device 210 can generate information about objects outside the vehicle 10. Information about an object can include at least one of information on presence or absence of the object, positional information of the object, information on a distance between the vehicle 10 and the object, and information on a relative speed of the vehicle 10 with respect to the object. The object detection device 210 can detect objects outside the vehicle 10. The object detection device 210 may include at least one sensor which can detect objects outside the vehicle 10. The object detection device 210 may include at least one of a camera, a radar, a lidar, an ultrasonic sensor and an infrared sensor. The object detection device 210 can provide data about an object generated on the basis of a sensing signal generated from a sensor to at least one electronic device included in the vehicle.

2.1) Camera

The camera can generate information about objects outside the vehicle 10 using images. The camera may include at least one lens, at least one image sensor, and at least one processor which is electrically connected to the image sensor, processes received signals and generates data about objects on the basis of the processed signals.

The camera may be at least one of a mono camera, a stereo camera and an around view monitoring (AVM) camera. The camera can acquire positional information of objects, information on distances to objects, or information on relative speeds with respect to objects using various image processing algorithms. For example, the camera can acquire information on a distance to an object and information on a relative speed with respect to the object from an acquired image on the basis of change in the size of the object over time. For example, the camera may acquire information on a distance to an object and information on a relative speed with respect to the object through a pin-hole model, road profiling, or the like. For example, the camera may acquire information on a distance to an object and information on a relative speed with respect to the object from a stereo image acquired from a stereo camera on the basis of disparity information.

The camera may be attached at a portion of the vehicle at which FOV (field of view) can be secured in order to photograph the outside of the vehicle. The camera may be disposed in proximity to the front windshield inside the vehicle in order to acquire front view images of the vehicle. The camera may be disposed near a front bumper or a radiator grill. The camera may be disposed in proximity to a rear glass inside the vehicle in order to acquire rear view images of the vehicle. The camera may be disposed near a rear bumper, a trunk or a tail gate. The camera may be disposed in proximity to at least one of side windows inside the vehicle in order to acquire side view images of the vehicle. Alternatively, the camera may be disposed near a side mirror, a fender or a door.

2.2) Radar

The radar can generate information about an object outside the vehicle using electromagnetic waves. The radar may include an electromagnetic wave transmitter, an electromagnetic wave receiver, and at least one processor which is electrically connected to the electromagnetic wave transmitter and the electromagnetic wave receiver, processes received signals and generates data about an object on the basis of the processed signals. The radar may be realized as a pulse radar or a continuous wave radar in terms of electromagnetic wave emission. The continuous wave radar may be realized as a frequency modulated continuous wave (FMCW) radar or a frequency shift keying (FSK) radar according to signal waveform. The radar can detect an object through electromagnetic waves on the basis of TOF (Time of Flight) or phase shift and detect the position of the detected object, a distance to the detected object and a relative speed with respect to the detected object. The radar may be disposed at an appropriate position outside the vehicle in order to detect objects positioned in front of, behind or on the side of the vehicle.

2.3) Lidar

The lidar can generate information about an object outside the vehicle 10 using a laser beam. The lidar may include a light transmitter, a light receiver, and at least one processor which is electrically connected to the light transmitter and the light receiver, processes received signals and generates data about an object on the basis of the processed signal. The lidar may be realized according to TOF or phase shift. The lidar may be realized as a driven type or a non-driven type. A driven type lidar may be rotated by a motor and detect an object around the vehicle 10. A non-driven type lidar may detect an object positioned within a predetermined range from the vehicle according to light steering. The vehicle 10 may include a plurality of non-drive type lidars. The lidar can detect an object through a laser beam on the basis of TOF (Time of Flight) or phase shift and detect the position of the detected object, a distance to the detected object and a relative speed with respect to the detected object. The lidar may be disposed at an appropriate position outside the vehicle in order to detect objects positioned in front of, behind or on the side of the vehicle.

3) Communication Device

The communication device 220 can exchange signals with devices disposed outside the vehicle 10. The communication device 220 can exchange signals with at least one of infrastructure (e.g., a server and a broadcast station), another vehicle and a terminal. The communication device 220 may include a transmission antenna, a reception antenna, and at least one of a radio frequency (RF) circuit and an RF element which can implement various communication protocols in order to perform communication.

For example, the communication device can exchange signals with external devices on the basis of C-V2X (Cellular V2X). For example, C-V2X can include sidelink communication based on LTE and/or sidelink communication based on NR. Details related to C-V2X will be described later.

For example, the communication device can exchange signals with external devices on the basis of DSRC (Dedicated Short Range Communications) or WAVE (Wireless Access in Vehicular Environment) standards based on IEEE 802.11p PHY/MAC layer technology and IEEE 1609 Network/Transport layer technology. DSRC (or WAVE standards) is communication specifications for providing an intelligent transport system (ITS) service through short-range dedicated communication between vehicle-mounted devices or between a roadside device and a vehicle-mounted device. DSRC may be a communication scheme that can use a frequency of 5.9 GHz and have a data transfer rate in the range of 3 Mbps to 27 Mbps. IEEE 802.11p may be combined with IEEE 1609 to support DSRC (or WAVE standards).

The communication device of the present invention can exchange signals with external devices using only one of C-V2X and DSRC. Alternatively, the communication device of the present invention can exchange signals with external devices using a hybrid of C-V2X and DSRC.

4) Driving Operation Device

The driving operation device 230 is a device for receiving user input for driving. In a manual mode, the vehicle 10 may be driven on the basis of a signal provided by the driving operation device 230. The driving operation device 230 may include a steering input device (e.g., a steering wheel), an acceleration input device (e.g., an acceleration pedal) and a brake input device (e.g., a brake pedal).

5) Main ECU

The main ECU 240 can control the overall operation of at least one electronic device included in the vehicle 10.

6) Driving Control Device

The driving control device 250 is a device for electrically controlling various vehicle driving devices included in the vehicle 10. The driving control device 250 may include a power train driving control device, a chassis driving control device, a door/window driving control device, a safety device driving control device, a lamp driving control device, and an air-conditioner driving control device. The power train driving control device may include a power source driving control device and a transmission driving control device. The chassis driving control device may include a steering driving control device, a brake driving control device and a suspension driving control device. Meanwhile, the safety device driving control device may include a seat belt driving control device for seat belt control.

The driving control device 250 includes at least one electronic control device (e.g., a control ECU (Electronic Control Unit)).

The driving control device 250 can control vehicle driving devices on the basis of signals received by the autonomous device 260. For example, the driving control device 250 can control a power train, a steering device and a brake device on the basis of signals received by the autonomous device 260.

7) Autonomous Device

The autonomous device 260 can generate a route for self-driving on the basis of acquired data. The autonomous device 260 can generate a driving plan for traveling along the generated route. The autonomous device 260 can generate a signal for controlling movement of the vehicle according to the driving plan. The autonomous device 260 can provide the signal to the driving control device 250.

The autonomous device 260 can implement at least one ADAS (Advanced Driver Assistance System) function. The ADAS can implement at least one of ACC (Adaptive Cruise Control), AEB (Autonomous Emergency Braking), FCW (Forward Collision Warning), LKA (Lane Keeping Assist), LCA (Lane Change Assist), TFA (Target Following Assist), BSD (Blind Spot Detection), HBA (High Beam Assist), APS (Auto Parking System), a PD collision warning system, TSR (Traffic Sign Recognition), TSA (Traffic Sign Assist), NV (Night Vision), DSM (Driver Status Monitoring) and TJA (Traffic Jam Assist).

The autonomous device 260 can perform switching from a self-driving mode to a manual driving mode or switching from the manual driving mode to the self-driving mode. For example, the autonomous device 260 can switch the mode of the vehicle 10 from the self-driving mode to the manual driving mode or from the manual driving mode to the self-driving mode on the basis of a signal received from the user interface device 200.

8) Sensing Unit

The sensing unit 270 can detect a state of the vehicle. The sensing unit 270 may include at least one of an internal measurement unit (IMU) sensor, a collision sensor, a wheel sensor, a speed sensor, an inclination sensor, a weight sensor, a heading sensor, a position module, a vehicle forward/backward movement sensor, a battery sensor, a fuel sensor, a tire sensor, a steering sensor, a temperature sensor, a humidity sensor, an ultrasonic sensor, an illumination sensor, and a pedal position sensor. Further, the IMU sensor may include one or more of an acceleration sensor, a gyro sensor and a magnetic sensor.

The sensing unit 270 can generate vehicle state data on the basis of a signal generated from at least one sensor. Vehicle state data may be information generated on the basis of data detected by various sensors included in the vehicle. The sensing unit 270 may generate vehicle attitude data, vehicle motion data, vehicle yaw data, vehicle roll data, vehicle pitch data, vehicle collision data, vehicle orientation data, vehicle angle data, vehicle speed data, vehicle acceleration data, vehicle tilt data, vehicle forward/backward movement data, vehicle weight data, battery data, fuel data, tire pressure data, vehicle internal temperature data, vehicle internal humidity data, steering wheel rotation angle data, vehicle external illumination data, data of a pressure applied to an acceleration pedal, data of a pressure applied to a brake panel, etc.

9) Position Data Generation Device

The position data generation device 280 can generate position data of the vehicle 10. The position data generation device 280 may include at least one of a global positioning system (GPS) and a differential global positioning system (DGPS). The position data generation device 280 can generate position data of the vehicle 10 on the basis of a signal generated from at least one of the GPS and the DGPS. According to an embodiment, the position data generation device 280 can correct position data on the basis of at least one of the inertial measurement unit (IMU) sensor of the sensing unit 270 and the camera of the object detection device 210. The position data generation device 280 may also be called a global navigation satellite system (GNSS).

The vehicle 10 may include an internal communication system 50. The plurality of electronic devices included in the vehicle 10 can exchange signals through the internal communication system 50. The signals may include data. The internal communication system 50 can use at least one communication protocol (e.g., CAN, LIN, FlexRay, MOST or Ethernet).

(3) Components of Autonomous Device

FIG. 17 is a control block diagram of the autonomous device according to an embodiment of the present invention.

Referring to FIG. 17, the autonomous device 260 may include a memory 140, a processor 170, an interface 180 and a power supply 190.

The memory 140 is electrically connected to the processor 170. The memory 140 can store basic data with respect to units, control data for operation control of units, and input/output data. The memory 140 can store data processed in the processor 170. Hardware-wise, the memory 140 can be configured as at least one of a ROM, a RAM, an EPROM, a flash drive and a hard drive. The memory 140 can store various types of data for overall operation of the autonomous device 260, such as a program for processing or control of the processor 170. The memory 140 may be integrated with the processor 170. According to an embodiment, the memory 140 may be categorized as a subcomponent of the processor 170.

The interface 180 can exchange signals with at least one electronic device included in the vehicle 10 in a wired or wireless manner. The interface 180 can exchange signals with at least one of the object detection device 210, the communication device 220, the driving operation device 230, the main ECU 240, the driving control device 250, the sensing unit 270 and the position data generation device 280 in a wired or wireless manner. The interface 180 can be configured using at least one of a communication module, a terminal, a pin, a cable, a port, a circuit, an element and a device.

The power supply 190 can provide power to the autonomous device 260. The power supply 190 can be provided with power from a power source (e.g., a battery) included in the vehicle 10 and supply the power to each unit of the autonomous device 260. The power supply 190 can operate according to a control signal supplied from the main ECU 240. The power supply 190 may include a switched-mode power supply (SMPS).

The processor 170 can be electrically connected to the memory 140, the interface 180 and the power supply 190 and exchange signals with these components. The processor 170 can be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The processor 170 can be operated by power supplied from the power supply 190. The processor 170 can receive data, process the data, generate a signal and provide the signal while power is supplied thereto.

The processor 170 can receive information from other electronic devices included in the vehicle 10 through the interface 180. The processor 170 can provide control signals to other electronic devices in the vehicle 10 through the interface 180.

The autonomous device 260 may include at least one printed circuit board (PCB). The memory 140, the interface 180, the power supply 190 and the processor 170 may be electrically connected to the PCB.

(4) Operation of Autonomous Device

FIG. 18 is a diagram showing a signal flow in an autonomous vehicle according to an embodiment of the present invention.

1) Reception Operation

Referring to FIG. 18, the processor 170 can perform a reception operation. The processor 170 can receive data from at least one of the object detection device 210, the communication device 220, the sensing unit 270 and the position data generation device 280 through the interface 180. The processor 170 can receive object data from the object detection device 210. The processor 170 can receive HD map data from the communication device 220. The processor 170 can receive vehicle state data from the sensing unit 270. The processor 170 can receive position data from the position data generation device 280.

2) Processing/Determination Operation

The processor 170 can perform a processing/determination operation. The processor 170 can perform the processing/determination operation on the basis of traveling situation information. The processor 170 can perform the processing/determination operation on the basis of at least one of object data, HD map data, vehicle state data and position data.

2.1) Driving Plan Data Generation Operation

The processor 170 can generate driving plan data. For example, the processor 170 may generate electronic horizon data. The electronic horizon data can be understood as driving plan data in a range from a position at which the vehicle 10 is located to a horizon. The horizon can be understood as a point a predetermined distance before the position at which the vehicle 10 is located on the basis of a predetermined traveling route. The horizon may refer to a point at which the vehicle can arrive after a predetermined time from the position at which the vehicle 10 is located along a predetermined traveling route.

The electronic horizon data can include horizon map data and horizon path data.

2.1.1) Horizon Map Data

The horizon map data may include at least one of topology data, road data, HD map data and dynamic data. According to an embodiment, the horizon map data may include a plurality of layers. For example, the horizon map data may include a first layer that matches the topology data, a second layer that matches the road data, a third layer that matches the HD map data, and a fourth layer that matches the dynamic data. The horizon map data may further include static object data.

The topology data may be explained as a map created by connecting road centers. The topology data is suitable for approximate display of a location of a vehicle and may have a data form used for navigation for drivers. The topology data may be understood as data about road information other than information on driveways. The topology data may be generated on the basis of data received from an external server through the communication device 220. The topology data may be based on data stored in at least one memory included in the vehicle 10.

The road data may include at least one of road slope data, road curvature data and road speed limit data. The road data may further include no-passing zone data. The road data may be based on data received from an external server through the communication device 220. The road data may be based on data generated in the object detection device 210.

The HD map data may include detailed topology information in units of lanes of roads, connection information of each lane, and feature information for vehicle localization (e.g., traffic signs, lane marking/attribute, road furniture, etc.). The HD map data may be based on data received from an external server through the communication device 220.

The dynamic data may include various types of dynamic information which can be generated on roads. For example, the dynamic data may include construction information, variable speed road information, road condition information, traffic information, moving object information, etc. The dynamic data may be based on data received from an external server through the communication device 220. The dynamic data may be based on data generated in the object detection device 210.

The processor 170 can provide map data in a range from a position at which the vehicle 10 is located to the horizon.

2.1.2) Horizon Path Data

The horizon path data may be explained as a trajectory through which the vehicle 10 can travel in a range from a position at which the vehicle 10 is located to the horizon. The horizon path data may include data indicating a relative probability of selecting a road at a decision point (e.g., a fork, a junction, a crossroad, or the like). The relative probability may be calculated on the basis of a time taken to arrive at a final destination. For example, if a time taken to arrive at a final destination is shorter when a first road is selected at a decision point than that when a second road is selected, a probability of selecting the first road can be calculated to be higher than a probability of selecting the second road.

The horizon path data can include a main path and a sub-path. The main path may be understood as a trajectory obtained by connecting roads having a high relative probability of being selected. The sub-path can be branched from at least one decision point on the main path. The sub-path may be understood as a trajectory obtained by connecting at least one road having a low relative probability of being selected at at least one decision point on the main path.

3) Control Signal Generation Operation

The processor 170 can perform a control signal generation operation. The processor 170 can generate a control signal on the basis of the electronic horizon data. For example, the processor 170 may generate at least one of a power train control signal, a brake device control signal and a steering device control signal on the basis of the electronic horizon data.

The processor 170 can transmit the generated control signal to the driving control device 250 through the interface 180. The driving control device 250 can transmit the control signal to at least one of a power train 251, a brake device 252 and a steering device 254.

FIG. 19 is a diagram for describing an example of a block configuration diagram of a V2X communication device according to an embodiment of the present invention.

Referring to FIG. 19, a V2X communication device according to an embodiment of the present invention includes a V2X device 1900. The V2X device 1900 may receive sensor data from an in-vehicle sensor 1960. In addition, the V2X device 1900 may receive GPS data from an out-vehicle GPS 1970. The GPS data may be received through an in-vehicle GPS receiver.

The V2X device 1900 includes a data multiple input processing module 1910 that receives the sensor data collected by the in-vehicle sensors and the GPS data collected by the out-vehicle GPS, respectively, and performs a multiplexing processing on the received sensor data and GPS data. The data multiple input processing module 1910 may multiplex each sensor data and GPS data in the in vehicle-sensors. By multiplexing the plurality of different sensor data, when errors are detected in the sensor data, it may serve to recover the errors of the sensor using the multiplexed data.

A non-received data estimation calculation module 1920 may estimate non-received data by referring to the multiplexed sensor data when the sensor data corresponding to specific data elements are not received in essential data element configuring coreData of a BSM message.

A malicious data estimation and malicious data replacement module 1930 may determine whether malicious data exists in the sensor data input to the data multiple input processing module 1910 and replace the malicious data with normal data. Here, the malicious data may be data in which sensor data are transmitted by the in-vehicle sensor but the transmitted data do not exist within a normal range. In addition, the malicious data may refer to data in which the sensor data are transmitted by the in-vehicle sensor but the state of the vehicle indicated by the transmitted data is different from the current state of the vehicle.

A V2X data handler 1940 may configure a BSM message set for V2X communication based on the data estimated by the non-received data estimation calculation module 1920 and the replaced data by the malicious data estimation and malicious data replacement module 1930. The message set is a collection of messages related to V2X operations. There is a message set meeting conditions of a host application. The message set is represented in a data frame format, and may include at least one element. Each element may include a data frame or a data element.

The BasicSafetyMessage is the most basic and important message in the message set and is used to periodically transmit basic information of the vehicle. The message may include coreData defined as BSMcoreData and PartII and regional data which are optional. The coreData may include data elements such as msgCnt, id, lat, long, elev, speed, deading, break, and size. The coreData uses data elements to display message count, ID, latitude, longitude, altitude, speed, direction, brake, vehicle size, and the like. The BSM may generally transmit information corresponding to the coreData in a cycle of 100 msec (10 times per second).

A V2X core stack & application layer 1950 may transmit the V2X message configured by the V2X Data Handler 1940 to another vehicle through a hierarchical layer in order to transmit and receive messages between vehicles. The application layer can implement and support various use cases. For example, the application may provide road safety, efficient traffic information, and other application information.

The application layer may classify and define ITS applications and provide services to end vehicles/users/infrastructures through lower layers. The application may be defined/applied by use-case, or defined/applied by grouping use-cases like road-safety, traffic efficiency, local service, and infotainment. According to an embodiment, application classification, use-case and the like may be updated when new application scenarios are generated.

Layer management can manage and service information related to the operation and security of the application layer. Information and services are transmitted and shared in both directions through an interface between management entity and application layer (MAMA) and interface between security entity and ITS-S applications (SA) or a service access point (SAP) (for example, MA-SAP and SA-SAP). A request from the application layer to a facility layer or a transmission of information from the facility layer to the application layer may be performed through an interface between facilities layer and ITS-S applications (FA) (or FA-SAP).

In addition to the application layer, there may be additionally a facility layer, a transport layer, a network layer, and the like.

FIG. 20 is a diagram for describing an example of data elements of a BSM message transmitted in the V2X communication device according to the embodiment of the present invention.

Referring to FIG. 20, a BSMcoreData may include data elements of msgCnt, id, secMak, lat, long, elev, accuracy, transmission, speed, heading, angle, accelSet, brakes, and size. Among the data elements, there may be data configured from the sensor data sensed by the sensor in the vehicle.

For example, the BSM message may include various data other than the sensor-based data. Among them, information on latitude, longitude, altitude, speed, direction, brake and the like may be based on data sensed by a vehicle itself. Therefore, when at least one of the plurality of sensors provided in the vehicle fails, omission may occur in essential data elements configuring the BSMcoreData. That is, when the sensor data are not received or the sensor data are received but there is a problem in the reliability of the received sensor data, the BSM message for performing the V2X communication may not be configured.

Hereinafter, a method of transmitting BasicSafetyMessage (BSM) message of a vehicle to everything (V2X) communication device provided in a vehicle in an autonomous driving system according to an embodiment of the present invention will be described in more detail.

FIG. 21 is a flowchart illustrating a method of transmitting a BSM message of a V2X communication device according to an embodiment of the present invention. The method of transmitting BSM message of a V2X communication device according to the embodiment of the present invention may be controlled by a processor of the V2X communication device.

Referring to FIG. 21, the processor may receive sensor data from a plurality of sensors provided in the vehicle (S2000).

The processor may multiplex the sensor data received from each of the plurality of sensors (S2010).

As described above, the multiplexing processing may be understood as configuring the multiplexed sensor data by receiving the sensor data from each of the plurality of different sensors. In addition, the multiplexing processing may include data outside the vehicle in addition to the sensor data acquired from the in-vehicle sensor. For example, GPS data received through the in-vehicle GPS receiver may be used for the multiplexing processing.

When the BSM message is not generated based on the received sensor data, the processor may generate the BSM message using at least one of the multiplexed sensor data (S2020).

Here, the case where the BSM message cannot be generated based on the received sensor data may mean a case where the received sensor data do not exist, a case where the received sensor data exists but are malicious data, a case where the malicious data are out of a tolerance range in comparison to sensor data acquired by a normal sensor.

According to the embodiment of the present invention, when the BSM message cannot be generated based on the received sensor data, it may be determined that the sensor fails, and sensor data that may replace a failed sensor may be based on multiplexed sensor data.

FIG. 22 is a diagram for describing an example of generating the BSM message of the V2X communication device according to the embodiment of the present invention.

Referring to FIG. 22, in a step of generating the BSM message, the processor may determine that the BSM message may not be generated by detecting that at least one of the plurality of sensors is an error (S2100).

If it is determined that the error is detected, the processor may determine whether at least one of the multiplexed sensor data may replace at least one data element configuring the coreData of the BSM message (S2110).

In addition, when at least one data element can be replaced, the processor may generate the BSM message based on a specific sensor data among the multiplexed sensor data (S2120).

For example, the processor may not obtain vehicle speed data among the coreData of the BSM message due to a failure of a wheel speed sensor in the vehicle. In this case, the processor may replace the speed information of the vehicle by using a path history generated based on GPS and GPS on the multiplexed data.

In addition, for example, it is not possible to acquire a gear state of a vehicle among the coreData of the BSM message due to a failure of a TransmissionState sensor. In this case, the processor may replace the data elements of the BSM message with D (Drive) if path information and GPS coordinates of a current vehicle move forward, P (Parking) if the current path information and GPS coordinates of the current vehicle are stopped, and R (Reverse) if the path information and GPS coordinates of the current vehicle move backward or the like.

FIG. 23 is a diagram for describing another example of generating the BSM message of the V2X communication device according to the embodiment of the present invention.

Referring to FIG. 23, in the step of generating the BSM message based on the specific sensor data (S2200), the processor may generate the BSM message by replacing the specific sensor data with the data element of the coreData (S2210).

In addition, when the BSM message is generated based on the specific sensor data, the processor may estimate missing data elements in the coreData using at least one sensor data of the plurality of multiplexed sensor data (S2220). The processor may generate the BSM message based on the estimated data elements (S2230).

FIG. 24 is a diagram for describing another example of generating the BSM message of the V2X communication device according to the embodiment of the present invention.

Referring to FIG. 24, the processor may determine whether the specific data elements exist among the core data (S2300).

If there is no data element corresponding to a specific sensor in the BSM message, it may be determined that the sensor is in a failure state because the sensor does not data. In addition, when the data element corresponding to the specific sensor does not exist, it may be determined that the error is detected due to the failure of the specific sensor among the plurality of sensors (S2310).

In this case, the processor may determine whether the V2X communication device may not receive the sensor data itself due to the failure of the sensor.

Meanwhile, if the processor determines that a data element corresponding to the specific sensor exists in the BSM message (S2300: YES), the processor may additionally determine whether the sensor data corresponding to the specific data elements are within the normal range (S2320). If the processor determines that the sensor data are not within the normal range, the processor may determine that the sensor data are detected as errors due to the failure of the sensor (S2310).

Meanwhile, if the processor determines that the sensor data are within the normal range, the processor may determine whether the sensor data corresponding to the specific data elements meet the current state of the vehicle (S2330).

If the processor determines that the sensor data corresponding to the specific data elements do not meet the current state of the vehicle, the processor may determine whether the values of the sensor data corresponding to the specific data elements are within an error range by comparing the multiplexed data with the sensor data corresponding to the specific data elements (S2340). If the processor determines that the values of the sensor data corresponding to the specific data elements are within the error range, the processor may regard the sensor data corresponding to the specific data elements as normal data and generate the BSM data based on the specific data elements (S2350).

Meanwhile, if the processor determines that the values of the sensor data corresponding to the specific data elements are out of the error range as a result of comparing the multiplexed data with the sensor data corresponding to the specific data elements, the processor may determine that the sensor data are malicious data which are not available and are detected as errors due to the failure of the sensor (S2340: No).

Meanwhile, if the processor determines that the sensor data corresponding to the specific data element meet the current state of the vehicle, the processor may generate the BSM data based on the specific data element.

For example, when a heading range of the vehicle has a range of 0 to 360° and a 400 value is received, the value may be determined to be out of the error range when compared to the sensor data by a normal heading sensor.

Also, for example, when the heading range of the vehicle is in the range of 0 to 360° and the actual heading is 100° but the sensing data are received at 200°, the processor may determine that the sensor data do not normally reflect the current state of the vehicle.

Meanwhile, according to an embodiment of the present invention, if the processor determines that a steeringWheelAngle sensor fails, the processor may estimate an angle of a wheel of a vehicle based on the GPS-based path history path information of the vehicle.

In addition, according to an embodiment of the present invention, when a AccelerationSet4Way sensor fails, the processor may replace a BSM data element corresponding to AccelerationSet4Way through a speculative calculation using AccelerationSet4Way, that is, acceleration for four ways, the GPS, and movement information.

Meanwhile, according to an embodiment of the present invention, when a brake sensor fails, the processor may replace the BSM data element by calculating brake information using the AccelerationSet4Way, the wheel speed, the GPS, and the like.

That is, according to an embodiment of the present invention, even if one V2X utilization sensor fails, the VSM message for the V2X communication may be supplemented by using other sensors in the vehicle, thereby enabling more robust V2X communication.

Meanwhile, in the step of generating the BSM message according to the embodiment of the present invention, the BSM message may be generated based on the GPS coordinates of the vehicle, the change trend of the GPS coordinates, and the movement path of the vehicle on the basis of the GPS data.

Meanwhile, the V2X communication device according to the embodiment of the present invention may perform an initial access procedure with a network for V2X communication. That is, the processor may receive from the network downlink control information (DCI) used to schedule the transmission of the BSM message. The transmission of the BSM message may be transmitted to the network based on the DCI.

Further, the processor may perform the initial access procedure with the network based on a synchronization signal block (SSB), in which the BSM message may be transmitted through PUSCH, and the SSB and DM-RS of the PUSCH may be QCLed for QCL type D.

The method for transmitting BSM data of a V2X communication device according to the embodiment of the present invention may be implemented in mode 3. The method of transmitting BSM data receives DCI format 5A from the network for scheduling of mode 3 transmission (PSCCH and/or PSSCH transmission), and transmits SCI format 1 for scheduling of the transmission of the BSM message to another vehicle on the PSCCH. In addition, the processor may transmit the BSM message to another vehicle on the PSSCH.

The method for transmitting BSM data of a V2X communication device according to the embodiment of the present invention may be implemented in mode 4. The processor senses a resource for mode 4 transmission in a first window, selects a resource for mode 4 transmission in a second window based on the sensed result, and SCI format 1 for scheduling the transmission of the BSM message to another vehicle on the PSCCH based on the selected resource. In addition, the processor may transmit the BSM message to another vehicle on the PSSCH.

The present disclosure described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The invention claimed is:

1. A method of transmitting a BasicSafetyMessage (BSM) message of a vehicle to everything (V2X) communication device provided in a vehicle in an autonomous driving system, the method comprising:
    receiving sensor data from a plurality of sensors provided in the vehicle;
    multiplexing the sensor data received from the plurality of sensors, respectively;
    determining whether the BSM message is not generated by detecting that at least one of the plurality of sensors is an error;
    determining whether at least one of the multiplexed sensor data replaces at least one data element configuring coreData of the BSM message when it is determined that the error is detected;
    generating the BSM message based on a specific sensor data among the multiplexed sensor data when the at least one data element is replaced; and
    transmitting the BSM message.

2. The method of claim 1, wherein in the generating of the BSM message based on the specific sensor data, the specific sensor data itself is replaced with the data element of the coreData.

3. The method of claim 1, wherein the generating of the BSM message based on the specific sensor data further includes:
- estimating a missing data element in the coreData using at least one of the plurality of multiplexed sensor data; and
- generating of the BSM message based on the estimated data element.

4. The method of claim 1, further comprising:
determining that the error is detected due to a failure of the specific sensor among the plurality of sensors when a specific data element does not exist in the core data.

5. The method of claim 4, further comprising:
- determining whether a sensor data corresponding to the specific data element existing in the core data is a data in a normal range; and
- determining that the error is detected due to the failure of the specific sensor when the sensor data is out of the normal range.

6. The method of claim 4, further comprising:
determining that the error is detected when the sensor data corresponding to the specific data element existing in the core data erroneously reflects a current state of the vehicle.

7. The method of claim 6, further comprising:
generating the BSM message using a value of the sensor data when the value of the sensor data corresponding to the specific data element is included in a preset error range by comparing with the multiplexed sensor data.

8. The method of claim 1, wherein the multiplexed data further includes a GPS data received from an external device.

9. The method of claim 8, wherein in the generating of the BSM message, the BSM message is generated based on a GPS coordinate of the vehicle, a change trend of the GPS coordinate, and a movement path of the vehicle on the basis of the GPS data.

10. The method of claim 1, further comprising:
- receiving downlink control information (DCI) used to schedule a transmission of the BSM message from a network,
- wherein the BSM message is transmitted to the network based on the DCI.

11. The method of claim 1, further comprising:
- performing an initial access procedure with a network based on a synchronization signal block (SSB),
- wherein the BSM message is transmitted through PUSCH, and
- the SSB and DM-RS of the PUSCH are QCLed for QCL type D.

12. The method of claim 1, further comprising:
- receiving DCI format 5A for scheduling of mode 3 transmission (PSCCH and/or PSSCH transmission) from a network;
- transmitting SCI format 1 for scheduling of the transmission of the BSM message to another vehicle on PSCCH; and
- transmitting the BSM message to the another vehicle on PSSCH.

13. The method of claim 1, further comprising:
- sensing a resource for mode 4 transmission in a first window;
- selecting the resource for the mode 4 transmission in a second window based on the sensed result;
- transmitting SCI format 1 for scheduling of a transmission of the BSM message based on the selected resource to another vehicle on PSCCH; and
- transmitting the BSM message to the another vehicle on PSSCH.

* * * * *